(12) United States Patent
Lee

(10) Patent No.: US 8,301,202 B2
(45) Date of Patent: Oct. 30, 2012

(54) MOBILE TERMINAL AND CONTROLLING METHOD THEREOF

(75) Inventor: Min Ho Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 12/704,335

(22) Filed: Feb. 11, 2010

(65) Prior Publication Data

US 2011/0053642 A1    Mar. 3, 2011

(30) Foreign Application Priority Data

Aug. 27, 2009 (KR) .................. 10-2009-0079696
Aug. 27, 2009 (KR) .................. 10-2009-0079697

(51) Int. Cl.
*H04B 1/38* (2006.01)

(52) U.S. Cl. .............. 455/566; 455/457; 455/556.1; 715/763; 715/764; 715/808

(58) Field of Classification Search .... 455/456.1–456.3, 455/457, 550.1, 552.1, 553.1, 556.2, 566, 455/427, 418–420, 556.1, 557; 340/988–996; 701/200–214, 418, 426, 429, 436, 438, 459, 701/487; 715/762–764, 808–810, 817–826, 715/855, 859–865
See application file for complete search history.

(56) References Cited

U.S. PATENT DOCUMENTS

| | | | |
|---|---|---|---|
| 7,408,137 B2* | 8/2008 | Sawachi | 250/208.1 |
| 7,720,436 B2* | 5/2010 | Hamynen et al. | 455/13.1 |
| 2004/0126038 A1 | 7/2004 | Aublant et al. | |
| 2005/0063563 A1* | 3/2005 | Soliman | 382/104 |
| 2005/0162523 A1* | 7/2005 | Darrell et al. | 348/211.2 |
| 2007/0162942 A1 | 7/2007 | Hamynen et al. | |
| 2008/0069404 A1* | 3/2008 | Lee et al. | 382/106 |
| 2008/0147730 A1* | 6/2008 | Lee et al. | 707/104.1 |
| 2008/0268876 A1* | 10/2008 | Gelfand et al. | 455/457 |
| 2009/0009626 A1* | 1/2009 | Ko et al. | 348/231.3 |
| 2009/0037101 A1* | 2/2009 | Koike et al. | 701/209 |
| 2009/0112452 A1* | 4/2009 | Buck et al. | 701/117 |
| 2009/0324058 A1* | 12/2009 | Sandage et al. | 382/154 |

OTHER PUBLICATIONS

Takacs et al., Outdoors Augmented Reality on Mobile Phone using Loxel-Based Visual Feature Organization, Proceedings of the 2008 ACM International Conference on Multimedia with Co-Located Symposium & Workshops, pp. 427-434, Oct. 27, 2008, XP007915264.

* cited by examiner

*Primary Examiner* — Jinsong Hu
*Assistant Examiner* — San Htun
(74) *Attorney, Agent, or Firm* — Birch, Stewart, Kolasch & Birch, LLP

(57) ABSTRACT

A mobile terminal including a user input unit configured to receive user-inputs, a wireless communication unit configured to wirelessly communicate with at least one other terminal, at least one camera configured to capture images, a touchscreen configured to display a camera preview image captured by the camera, a position-location processor configured to obtain information on a current position of the mobile terminal, and a controller configured to display textual object information on the touchscreen identifying objects included within the preview image based on the obtained current position of the mobile terminal.

20 Claims, 17 Drawing Sheets

(5-1)

(5-2)

(5-3)

(6-1)

(6-2)

(8-1)

(8-2)

(12-1)

(12-2)

(14-1)

(14-2)

(14-3)

MOBILE TERMINAL AND CONTROLLING METHOD THEREOF

Pursuant to 35 U.S.C. §119(a), this application claims the benefit of an earlier filing date and right of priority to Korean Application Nos. 10-2009-0079696 and 10-2009-0079697, filed on Aug. 27, 2009, the contents of which are hereby incorporated by reference in their entirety.

BACKGROUND OF THE INVENTION

1. Field of the Invention

The present invention relates to a mobile terminal and corresponding method for displaying object textual information on the touchscreen identifying objects included within a preview image based on an obtained current position of the mobile terminal.

2. Discussion of the Related Art

A mobile terminal is a device which may be configured to perform various functions. Examples of such functions include data and voice communications, capturing images and video via a camera, recording audio, playing music files, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. In addition, the mobile terminals can be further classified into handheld terminals and vehicle mount terminals. There are ongoing efforts to support and increase the functionality of mobile terminals. Such efforts include software and hardware improvements, as well as changes and improvements in the structural components which form the mobile terminal.

The mobile terminal also includes a camera allowing the user to take pictures or movies. Also, the mobile terminal includes a graphical user interface to assist the user in taking pictures or movies. However, the information provided is limited in nature.

SUMMARY OF THE INVENTION

Accordingly, one object of the present invention is to provide a mobile terminal and controlling method thereof that substantially obviates one or more problems due to limitations and disadvantages of the related art.

Another object of the present invention is to provide a mobile terminal and controlling method thereof that displays object textual information on the touchscreen identifying objects included within the preview image based on the obtained current position of the mobile terminal.

To achieve these objects and other advantages and in accordance with the purpose of the invention, as embodied and broadly described herein, the present invention provides in one aspect a mobile terminal including a user input unit configured to receive user-inputs, a wireless communication unit configured to wirelessly communicate with at least one other terminal, at least one camera configured to capture images, a touchscreen configured to display a camera preview image captured by the camera, a position-location processor configured to obtain information on a current position of the mobile terminal, and a controller configured to display textual object information on the touchscreen identifying objects included within the preview image based on the obtained current position of the mobile terminal.

In another aspect, the present invention provides a method of controlling a mobile terminal, and which includes allowing, via a wireless communication unit, wireless communication with at least one other terminal, capturing, via at least one camera provided on the mobile terminal, a camera preview image, displaying, on a touchscreen of the mobile terminal, the captured camera preview image, obtaining, via a position-location processor, information on a current position of the mobile terminal, and displaying, via a controller, textual object information on the touchscreen identifying objects included within the preview image based on the obtained current position of the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

In addition, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can also be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators. However, by way of non-limiting example only, further description will be made with regard to a mobile terminal 100, and it should be noted that such teachings may apply equally to other types of terminals.

Figure 1:
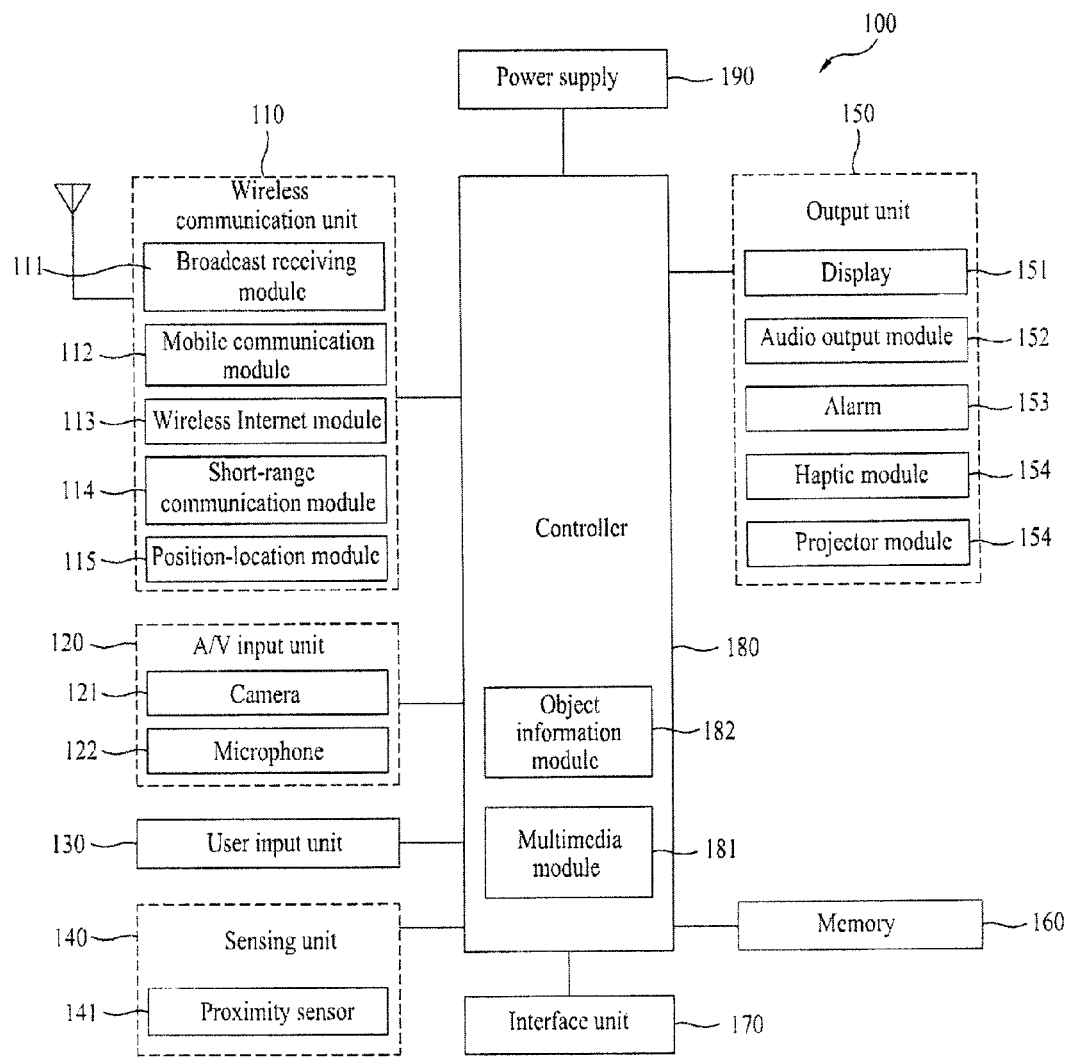
FIG. 1 is a block diagram of a mobile terminal according to one embodiment of the present invention.

FIG. 1 is a block diagram of a mobile terminal 100 according to an embodiment of the present invention. As shown in FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 also shows the mobile terminal 100 having various components, but implementing all of the illustrated components is not a requirement. Greater or fewer components may alternatively be implemented.

In addition, the wireless communication unit 110 generally includes one or more components which permits wireless communication between the mobile terminal 100 and a wireless communication system or network within which the mobile terminal 100 is located. For instance, in FIG. 1, the wireless communication unit 110 includes a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel. In addition, the broadcast channel may include a satellite channel and a terrestrial channel.

Further, the broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can also be provided to the mobile terminal 100 to simultaneously receive at least two broadcast channels or broadcast channel switching facilitation. The broadcast associated information includes information associated with a broadcast channel, a broadcast program, a broadcast service provider, etc. Also, the broadcast associated information can be provided via a mobile communication network. In this instance, the broadcast associated information can be received by the mobile communication module 112.

Further, the broadcast associated information can be implemented in various forms. For instance, broadcast associated information may include an electronic program guide (EPG) of the digital multimedia broadcasting (DMB) system and an electronic service guide (ESG) of the digital video broadcast-handheld (DVB-H) system.

The broadcast receiving module 111 may also be configured to receive broadcast signals transmitted from various types of broadcast systems. In a non-limiting example, such broadcasting systems include the digital multimedia broadcasting-terrestrial (DMB-T) system, the digital multimedia broadcasting-satellite (DMB-S) system, the digital video broadcast-handheld (DVB-H) system, the DVB-CBMS system, the OMA-BCAST system, the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-explained digital broadcasting systems. The broadcast signal and/or broadcast associated information received by the broadcast receiving module 111 can also be stored in a suitable device, such as a memory 160.

In addition, the mobile communication module 112 transmits/receives wireless signals to/from one or more network entities (e.g., base station, external terminal, server, etc.). Such wireless signals may represent audio, video, and data according to text/multimedia message transceivings, among others.

Further, the wireless Internet module 113 supports Internet access for the mobile terminal 100, and may be internally or externally coupled to the mobile terminal 100. The wireless Internet technology can include WLAN (Wireless LAN) (Wi-Fi), Wibro (Wireless broadband), Wimax (World Interoperability for Microwave Access), HSDPA (High Speed Downlink Packet Access), etc. The mobile terminal 100 also accesses an external server provided with an object information database through a wireless Internet access, searches the object information database for desired object information, and is then able obtain the object information.

In addition, the short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Also, the position-location module 115 identifies or otherwise obtains the location of the mobile terminal 100. If desired, this module may be implemented with a global positioning system (GPS) module. Further, the GPS module 115 can precisely calculate current 3-dimensional position information based on at least one of a longitude, latitude and altitude and direction (or orientation) by calculating distance information and precise time information from at least three satellites and then applying triangulation to the calculated information. The location and time information are calculated using three satellites, for example, and errors of the calculated location position and time informations are then amended using another satellite. The GPS module 115 can also calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. The processed image frames can also be displayed on the display 151. Further, the image frames processed by the camera 121 can be stored in the memory 160 or can be externally transmitted via the wireless communication unit 110. Optionally, at least two cameras 121 can be provided to the mobile terminal 100 according to environment of usage.

In addition, the microphone 122 receives an external audio signal while the portable device is in a particular mode, such as phone call mode, recording mode and voice recognition. This audio signal is then processed and converted into electric audio data. The processed audio data is transformed into a format transmittable to a mobile communication base station via the mobile communication module 112 for a call mode. The microphone 122 can also include assorted noise removing algorithms to remove noise generated in the course of receiving the external audio signal.

In addition, the user input unit 130 generates input data responsive to user manipulation of an associated input device or devices. Examples of such devices include a keypad, a dome switch, a touchpad (e.g., static pressure/capacitance), a jog wheel, a jog switch, etc. Further, the sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, when the mobile terminal 100 is configured as a slide-type mobile terminal, the sensing unit 140 can sense whether a sliding portion of the mobile terminal is opened or closed. Other examples include the sensing unit 140 sensing the presence or absence of power provided by the power supply 190, the presence or absence of a coupling or other connection between the interface unit 170 and an external device. In FIG. 1, the sensing unit 140 also includes a proximity sensor 141.

Further, the output unit 150 generates outputs relevant to the senses of sight, hearing, touch and the like. The output unit 150 also includes the display 151, an audio output module 152, an alarm unit 153, a haptic module 154, a projector module 155 and the like. In addition, the display 151 is implemented to visually display or output information associated with the mobile terminal 100. For instance, if the mobile terminal is operating in a phone call mode, the display can provide a user interface (UI) or graphical user interface (GUI) which includes information associated with placing, conducting, and terminating a phone call. As another example, if the mobile terminal 100 is in a video call mode or a photographing mode, the display 151 can additionally or alternatively display images which are associated with these modes, the UI or the GUI.

The display module 151 may be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 may also include one or more of such displays.

Some of the above displays can be implemented in a transparent or optical transmittive type, which are referred to as a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can also be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), the display 151 can be as an input device as well as an output device. In this instance, the touch sensor can be configured as a touch film, a touch sheet, a touchpad or the like.

Further, the touch sensor can be configured to convert a pressure applied to a specific portion of the display 151 or a variation of a capacitance generated from a specific portion of the display 151 to an electric input signal. Moreover, the touch sensor can also be configured to detect a pressure of a touch as well as a touched position or size.

In addition, if a touch input is made to the touch sensor, signal(s) corresponding to the touch is transferred to a touch controller. The touch controller then processes the signal(s) and transfers the processed signal(s) to the controller 180. Therefore, the controller 180 can determine whether a prescribed portion of the display 151 is touched.

Referring to FIG. 1, the proximity sensor 141 can be provided to an internal area of the mobile terminal 100 enclosed by the touchscreen or around the touchscreen. The proximity sensor 141 can also detect a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. Also, when the touchscreen includes the electrostatic capacity proximity sensor, the proximity sensor 141 can detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 also detects a proximity touch and a proximity touch pattern (e.g., a proximity touch distance, a proximity touch duration, a proximity touch position, a proximity touch shift state, etc.). Also, information corresponding to the detected proximity touch action and the detected proximity touch pattern can be output to the touchscreen.

Further, the audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., a call received, message received, etc.). The audio output module 152 can also be implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 can also output a signal for announcing the event occurrence by way of vibration as well as video or audio signal. Further, the video or audio signal can be output via the display 151 or the audio output unit 152. Hence, the display 151 or the audio output module 152 can be regarded as a part of the alarm unit 153.

In addition, the haptic module 154 generates various tactile effects that can be sensed by a user. Vibration is a representative one of the tactile effects generated by the haptic module 154. The strength and pattern of the vibration generated by the haptic module 154 can also be controlled. For instance, different vibrations can be output in a manner of being synthesized together or can be output in sequence.

The haptic module 154 can also generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can also be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

In addition, the projector module 155 performs an image projector function using the mobile terminal 100. in more detail, the projector module 155 can display an image, which is identical to or partially different at least from the image displayed on the display 151, on an external screen or wall according to a control signal of the controller 180.

In particular, the projector module 155 can include a light source for generating light (e.g., a laser) for externally projecting an image, an image producing mechanism for producing and externally outputting an using the light generated from the light source, and a lens for enlarging and outputting the image externally in a predetermined focus distance. In addition, the projector module 155 can further include a device for adjusting an image projected direction by mechanically moving the lens or the whole module.

Further, the projector module 155 can be classified into a CRT (cathode ray tube) module, an LCD (liquid crystal display) module, a DLP (digital light processing) module or the like according to a device type of a display. In particular, the DLP module is operated by the mechanism of enabling the light generated from the light source to reflect on a DMD (digital micro-mirror device) chip and can be advantageous for the downsizing the projector module 151. Preferably, the projector module 155 can be provided in a length direction of a lateral, front or backside direction of the mobile terminal 100. However, the projector module 155 can also be provided to any portion of the mobile terminal 100.

In addition, the memory 160 can store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. A recent use history or a cumulative use frequency of each data (e.g., use frequency for each phonebook, each message or each multimedia) can also be stored in the memory 160. Moreover, data for various patterns of vibration and/or sound output for a touch input to the touchscreen can be stored in the memory 160.

The memory 160 can also store a database relating to object information of an object (e.g., a building, shop, milestone, etc.) that can be searched using at least one of shape recognizing information related to the object within an image photographed by the camera and position information of the mobile terminal 100 obtained through the position-location module 115. The object information can include at least one of relevant text information (e.g., a name of the building, a name of the shop, etc.), relevant link information (e.g., web link information of the building, link information of the shop, etc.), relevant image information (e.g., an image logo of the building, an image logo of the shop, etc.) and audio information (e.g., a logo song of the building, a logo song of the shop, etc.) of the shape recognized object. The above-noted object information are examples only and other types of object information can be displayed.

Further, the database stored in the memory 160 can be updated or downloaded from a database of an external server via the wireless communication unit. The database of the memory 160 can also include the data constructed in a manner of downloading every part of the database of the external server. Alternatively, the database of the memory 160 can include the data constructed in a manner of downloading a portion of the database of the external server in consideration of the capacity of the memory 160. Further, the portion of the database of the external server may be provided for an object located within a predetermined distance from a current location of the terminal or may be provided for an object located in a predetermined area (e.g., an administrative district) related to the current location of the terminal.

In addition, the memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. The mobile terminal 100 can also operate in association with a web storage for performing a storage function of the memory 160 on Internet.

Further, the interface unit 170 is used to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may also be configured using a wired/wireless headset port, an external charger port, a wired/wireless data port, a memory card port, a port for coupling to a device having an identity module, audio input/output ports, video input/output ports, an earphone port and/or the like.

In addition, the identity module is the chip for storing various types of information for authenticating a use authority of the mobile terminal 100 and can include a User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

Further, when the mobile terminal 110 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

Further, the controller 180 controls the overall operations of the mobile terminal 100. For example, the controller 180 performs the control and processing associated with voice calls, data communications, video calls, etc. In FIG. 1, the controller 180 includes a multimedia module 181 that provides multimedia playback. The multimedia module 181 may be configured as part of the controller 180 or be implemented as a separate component.

Moreover, the controller 180 can perform a pattern (that is, shape or image) recognizing process for recognizing a writing input and a picture drawing input performed on the touchscreen as characters or images, respectively. The controller 180 can also identify a prescribed image part of a prescribed image (e.g., a camera preview image, a play image) through the shape recognizing processing.

Meanwhile, the controller 180 can be configured to implement augmented reality (abbreviated AR or named enhanced reality). The augmented reality is a sort of virtual reality that combines a real world seen through the user's eyes and a virtual world having side information into one image. Namely, the augmented reality, which complements a real world with a virtual world, plays a role in providing information necessary for the real world additionally using graphics. The controller 180 can also display the object information in form of the augmented reality.

In FIG. 1, the controller 180 also includes an object information module 182 for the processing related to a display of the object information. Further, the object information module 182 can be implemented within the controller 180 or be being separated from the controller 180. In addition, the power supply unit 190 provides power required by the various components for the mobile terminal 100. The power may be internal power, external power, or combinations thereof.

Also, various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
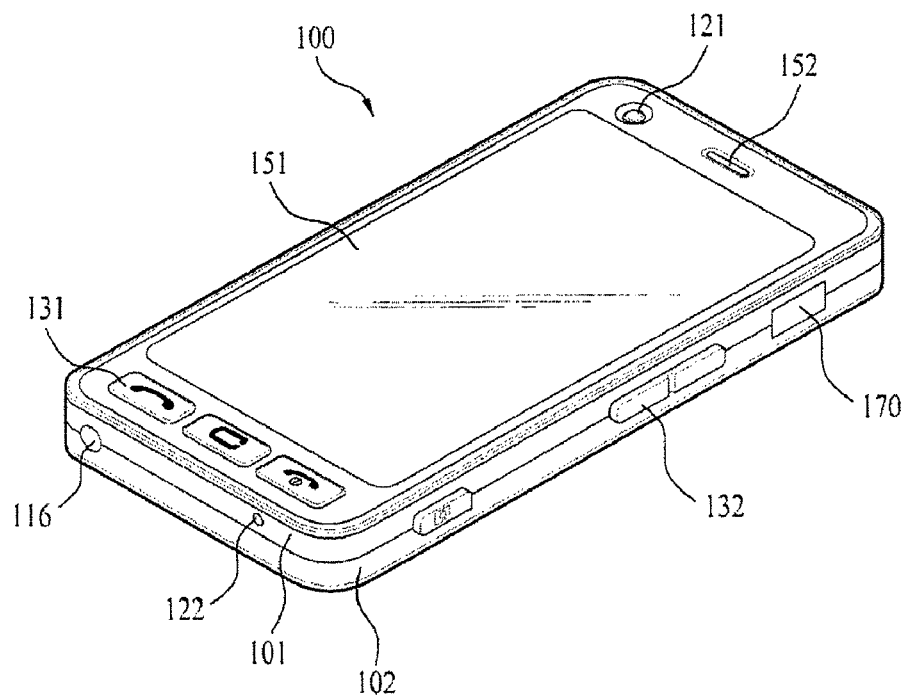
FIG. 2A is a front perspective diagram of a mobile terminal according to one embodiment of the present invention.

Turning next to FIG. 2A, a front perspective diagram of the mobile terminal 100 according to one embodiment of the present invention is shown. The mobile terminal 100 shown in the drawing has a bar type terminal body. However, the mobile terminal 100 may be implemented in a variety of different configurations. Examples of such configurations include a folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case is divided into a front case 101 and a rear case 102. Various electric/electronic parts are also loaded in a space provided between the front and rear cases 101 and 102. Optionally, at least one middle case can be further provided between the front and rear cases 101 and 102. The cases 101 and 102 can also be formed by injection molding of synthetic resin or can be formed of metal substance such as stainless steel (STS), titanium (Ti) or the like for example.

The display 151, the audio output unit 152, the camera 121, user input units 130/131 and 132, the microphone 122, the interface 180 and the like can also be provided to the terminal body, and more particularly, to the front case 101. Further, as shown, the display 151 occupies most of a main face of the front case 101, and the audio output unit 151 and the camera 121 are provided to an area adjacent to one of both end portions of the display 151. Also, the user input unit 131 and the microphone 122 are provided to another area adjacent to the other end portion of the display 151. The user input unit 132 and the interface 170 are also provided to lateral sides of the front and rear cases 101 and 102.

In addition, the input unit 130 is manipulated to receive a command for controlling an operation of the terminal 100. Further, the input unit 130 in this example includes a plurality of manipulating units 131 and 132. The manipulating units 131 and 132 can thus be referred to as a manipulating portion and may adopt any mechanism of a tactile manner that enables a user to perform a manipulation action by experiencing a tactile feeling.

In addition, content input by the first or second manipulating units 131 or 132 can be diversely set. For instance, such a command as start, end, scroll and the like can be input to the first manipulating unit 131, and a command for a volume adjustment of sound output from the audio output unit 152, a command for a switching to a touch recognizing mode of the display 151 or the like can be input to the second manipulating unit 132.

Figure 2B:
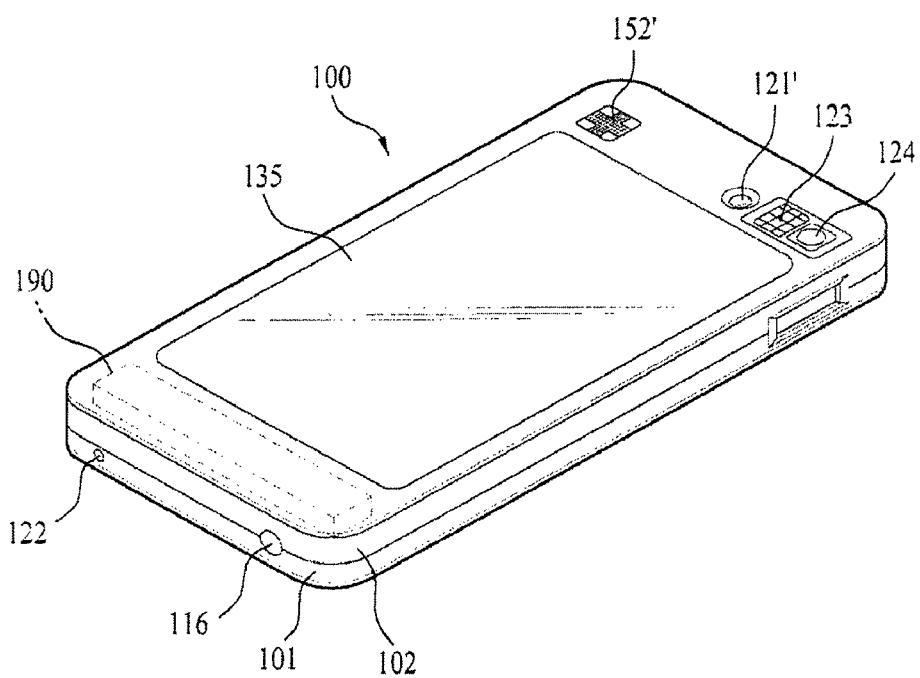
FIG. 2B is a rear perspective diagram of a mobile terminal according to one embodiment of the present invention.

Next, FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121' also has a photographing direction that is substantially opposite to that of the camera 121 shown in FIG. 2A and may have pixels differing from those of the firmer camera 121.

Preferably, for instance, the camera 121 has low pixels enough to capture and transmit a picture of user's face for a video call, while the camera 121' has high pixels for capturing a general subject for photography without transmitting the captured subject. Also, each of the cameras 121 and 121' can be installed at the terminal body to be rotated or popped up. Also, the camera 121' of the rear case 102 can be used for a video call.

In addition, a flash 123 and a mirror 124 are additionally provided adjacent to the camera 121'. The flash 123 projects light toward a subject when photographing the subject using the camera 121'. When the user attempts to take a picture of the user (self-photography) using the camera 121', the mirror 124 allows the user to view user's face reflected by the mirror 124. An additional audio output unit 152' can also be provided to the backside of the terminal body. The additional audio output unit 152' can thus implement a stereo function together with the former audio output unit 152 shown in FIG. 2A and may be used for implementation of a speakerphone mode.

Further, as shown in FIG. 2B, a broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body. The power supply unit 190 for supplying power to the terminal 100 is also provided to the terminal body. Further, the power supply unit 190 can be configured to be built within the terminal body or be detachably connected to the terminal body.

A touchpad 135 for detecting a touch can also be provided to the rear case 102. The touchpad 135 can be configured in a light transmittive type like the display 151. In this instance, if the display 151 is configured to output visual information from both faces, the display 151 can recognize the visual information via the touchpad 135 as well. The information output from both of the faces can also be entirely controlled by the touchpad 135. Alternatively, a display can be provided to the touchpad 135 so that a touchscreen can be provided to the rear case 102 as well.

In addition, the touchpad 135 is activated by interconnecting with the display 151 of the front case 101. The touchpad 135 can also be provided in rear of the display 151 in parallel, and can have a size equal to or smaller than that of the display 151.

In the following description of the embodiments, the display 151 includes a touchscreen, which is indicated by a reference number 400. An environment for implementing a method of controlling a mobile terminal according to an embodiment of the present invention will now be explained with reference to FIG. 3.

Figure 3:
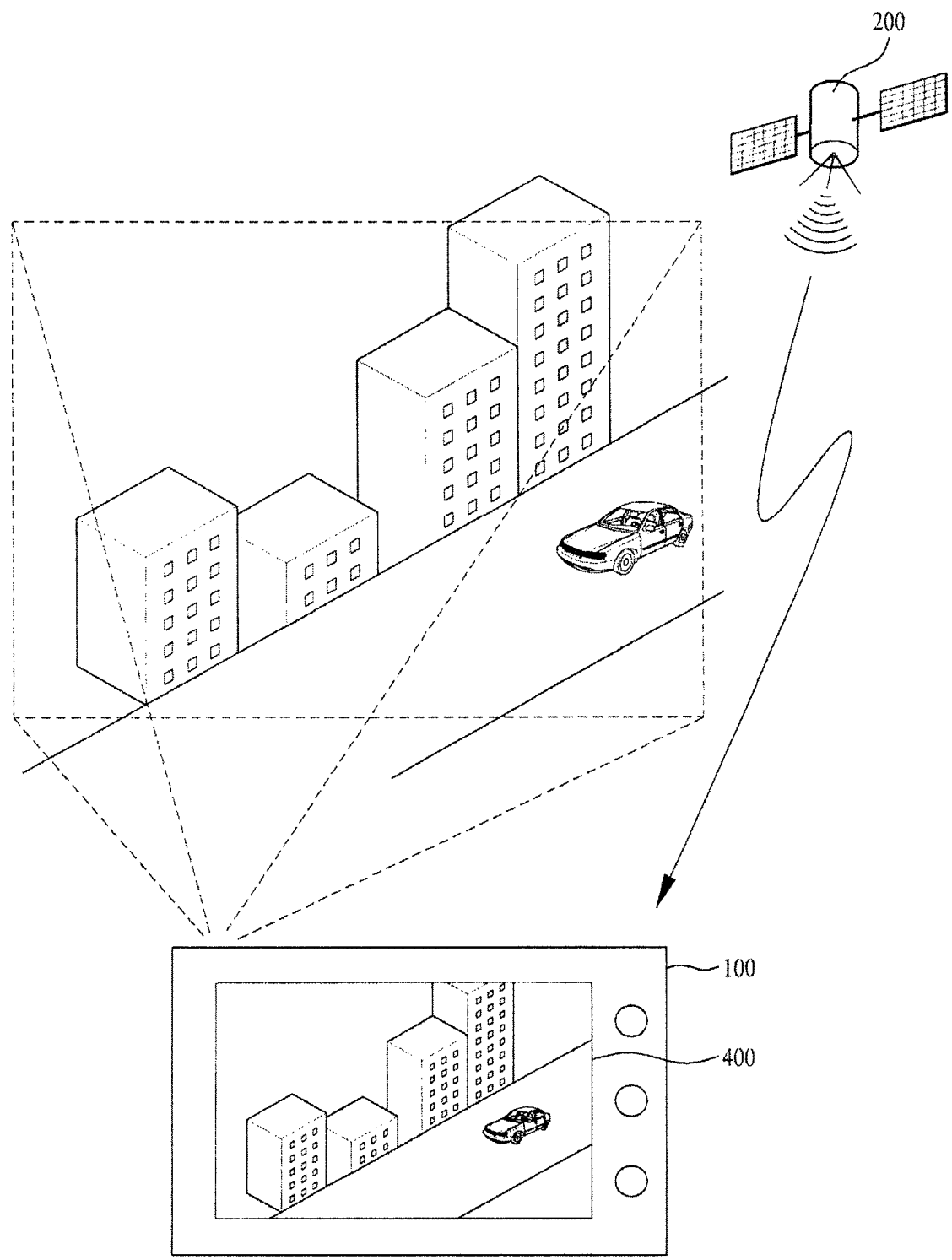
FIG. 3 is a diagram of an environment for implementing a method of controlling a mobile terminal according to an embodiment of the present invention.

In particular, FIG. 3 is a diagram of an environment for implementing a method of controlling a mobile terminal according to an embodiment of the present invention. Referring to FIG. 3, the mobile terminal 100 can photograph a peripheral image as a preview image (hereinafter called 'camera preview image') using the camera 121. The mobile terminal 100 is then able to display the camera preview image on the touchscreen 400.

Further, the mobile terminal 100 can receive position information such as a latitude, a longitude, an altitude and a direction of the mobile terminal 100 from the position-location module 115. The controller 180 then identifies an object included in the camera preview image using at least one of the position information and shape recognizing information of the camera preview image and displays information on the object (i.e., object information) on the touchscreen 400.

Figure 4:
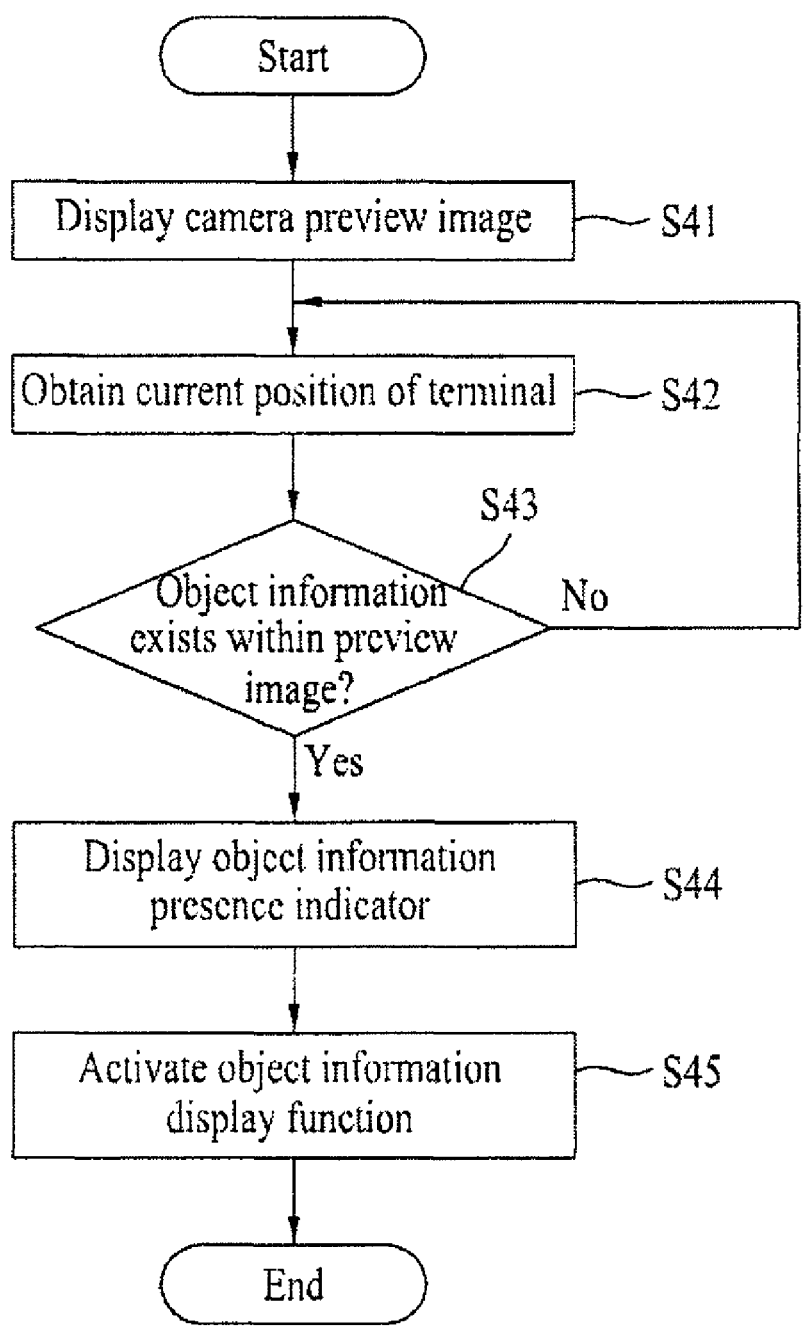
FIG. 4 is a flowchart illustrating a method of controlling a mobile terminal according to an embodiment of the present invention.
Figure 5:
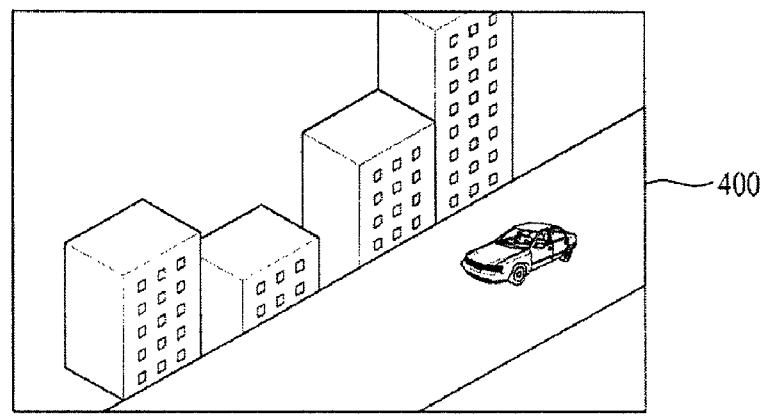
FIGS. 5 and 6 are diagrams of display screen configurations for implementing a method of controlling a mobile terminal according to an embodiment of the present invention.
Figure 5:
Figure 5:
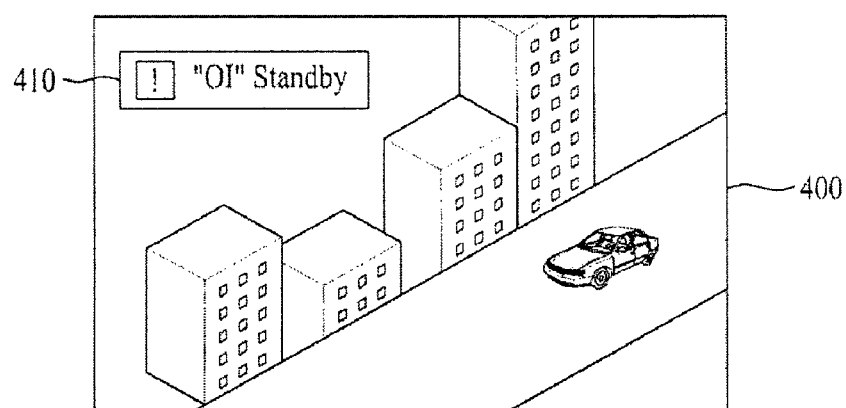
Figure 5:
Figure 5:
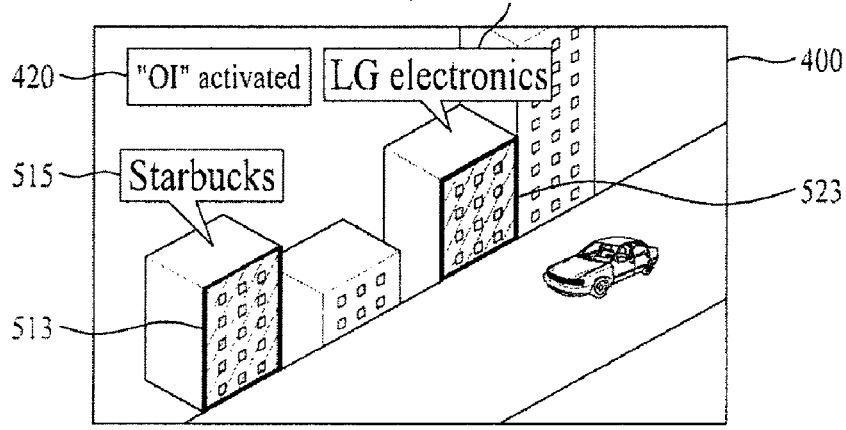
Figure 6:
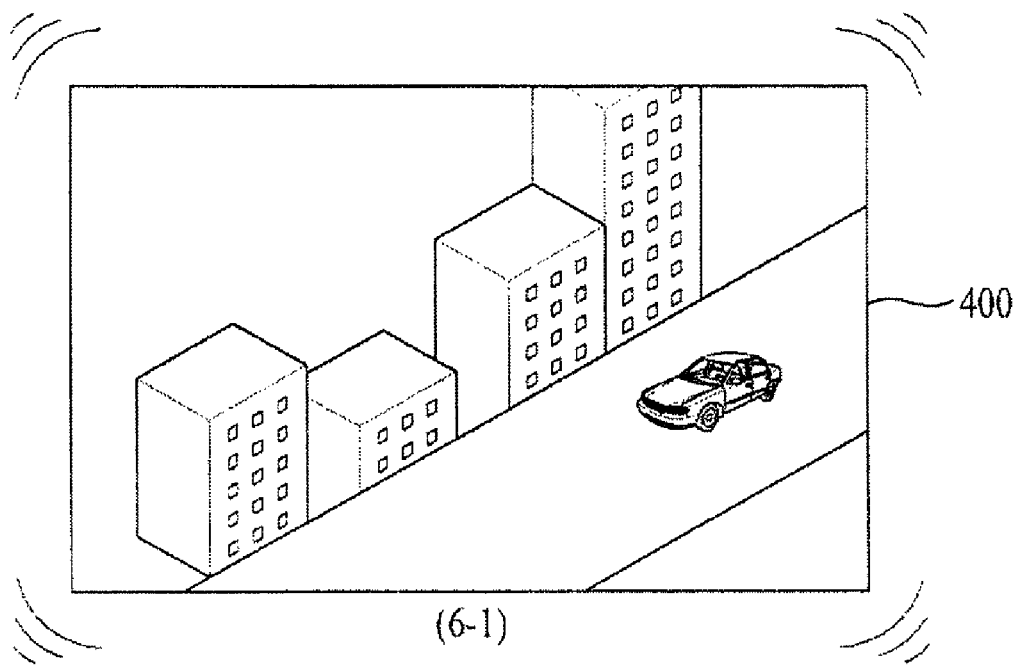
Figure 6:
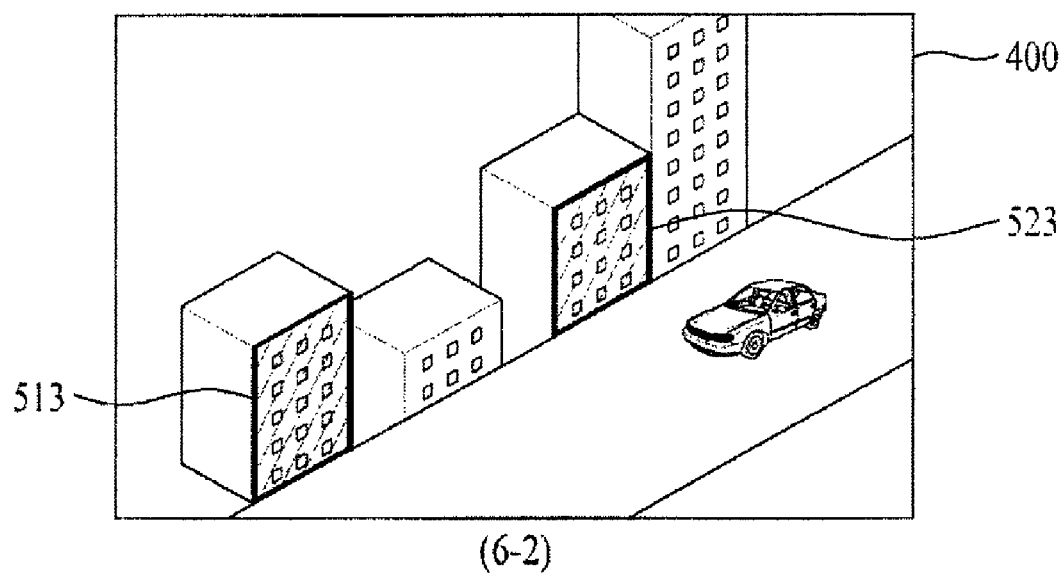

Next, FIG. 4 is a flowchart illustrating a method of controlling a mobile terminal according to an embodiment of the present invention, and FIG. 5 and FIG. 6 are diagrams of display screen configurations for implementing a method of controlling a mobile terminal according to an embodiment of the present invention.

Referring to FIGS. 4 and (5-1) of FIG. 5, the camera preview image is displayed on the touchscreen 400 (S41). Further, the controller 180 obtains current position information of the mobile terminal 100 via the position location module 115 (S42). Optionally, the steps S41 and S42 can be performed simultaneously or in reverse order.

The controller 180 then determines whether object information corresponding to at least one object exists within the camera preview image using at least one of the obtained current position information and shape recognizing information of the camera preview image (S43). If the corresponding object information does not exist within the camera preview image (No in S43), the controller 180 continuously or periodically obtains the current position information of the mobile terminal 100 to recognize whether the mobile terminal 100 is moving.

In addition, the object information can be downloaded from an external server, for example, or can be maintained in the memory of the mobile terminal. The controller 180 can also use the obtained location of the mobile terminal to search the external server or memory of the terminal to determine objects that exist within or near the obtained location of the terminal. The controller 180 can also use shapes of the objects in the preview image to determine if the shapes match any object information existing in the external server or memory, for example. Thus, the controller 180 can determine objects that exist within the preview image, search the memory or external server for object information that matches the objects, and then provide object information to the user. The object information can also be periodically downloaded from the server and stored in the memory as the location of the mobile terminal changes. The user can also select a predetermined option requesting object information be downloaded from a server.

Referring to FIG. 4 and (5-2) of FIG. 5, if the corresponding object information (OI) exists within the camera preview image (Yes in S43), the controller 180 displays object information presence indicator 410 indicating that the corresponding object exists on the touchscreen (S44). This indication of the presence of the corresponding object information can be provided to a terminal user in one of various types and/or methods different from (5-2) of FIG. 5. This will be explained in more detail later.

Subsequently, an object information display function for displaying the object information on the touchscreen 400 can be activated in the mobile terminal 100 (S45). Further, there are various methods of activating the object information display function. This will be explained in more detail later.

Referring to (5-3) of FIG. 5, the controller 180 displays an object information display function activation indicator 420 indicating that the object information display function has been activated on the touchscreen 400. When the object information is not displayed in the camera preview image, the terminal user can easily recognize that the object information is not displayed because object information does not exist in the camera preview image or because the object information display function is not activated despite the presence of the object information in the camera preview image.

Also, (5-3) of FIG. 5 illustrates that two objects (i.e., a first object and a second object) exist in the camera preview image displayed on the touchscreen. However, this is an example only, and the present embodiment is not limited to this example. For example, one object or at least three or more objects can exist in the camera preview image.

In addition, as shown in (5-3) of FIG. 5, the controller 180 displays a first object display indicator 513 and a first object information 515 corresponding to the first object, and displays a second object display indicator 523 and a second object information 525 corresponding to the second object. Optionally, the object information can be displayed only without displaying the object display indicator. Further, the object display indicator is recognized as a part of the object information to play a role as one object information. Moreover, the object display indicator can mean the object information. Thus, as shown in (5-3) of FIG. 5, the user can see that a Starbucks and LG Electronics are within the preview image.

Various types and/or methods of indicating that the corresponding object information exists will now be further explained with reference to FIG. 6. Referring to (6-1) of FIG. 6, the mobile terminal 100 allows a terminal user to be aware that the corresponding object information exists by generating vibration if the corresponding object information exists.

Referring to (6-2) of FIG. 6, the mobile terminal 100 allows a terminal user to be aware that the corresponding object information exists by displaying the first object display indicator 513 and the second object display indicator 523 for objects respectively in the camera preview image displayed on the touchscreen 400 (e.g., in this example, the outline of the objects are highlighted). In this instance, the object display indicator can play a role as the object information presence indicator.

Next, various methods for activating the object information display function in the mobile terminal 100 will be explained. First of all, a terminal user is able to activate the object information display function via a proper key manipulation of the user input unit 130. This is apparent to those of ordinary skill in this technological field without separate explanation and thus its details will be omitted from the following description.

In another example, the user can shake the mobile terminal 100 to have the controller 180 activate the object information display function. In still another example, the user can touch a specific part of the touchscreen 400 (e.g., the object information presence indicator 410) to activate the object information display function.

Further, in another example, if object information exists on an object located within a predetermined distance from a current location of the terminal, the controller 180 can automatically activate the object information display function. In addition, after the object information display function has been activated, and as the mobile terminal moves so that corresponding object information does not exist within the predetermined distance, the controller 180 can automatically deactivate the object information display function.

Figure 7:
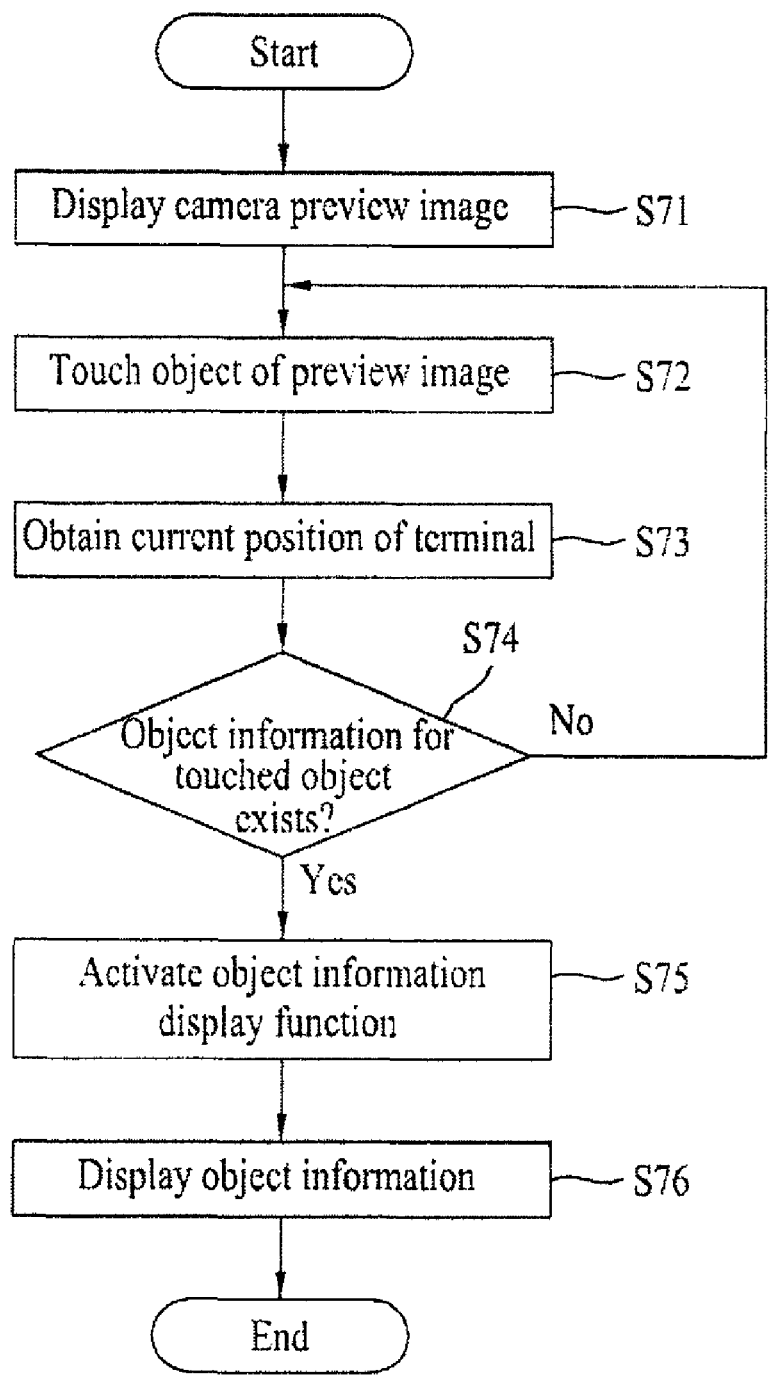
FIG. 7 is a flowchart illustrating a method of controlling a mobile terminal according to an embodiment of the present invention.
Figure 8:
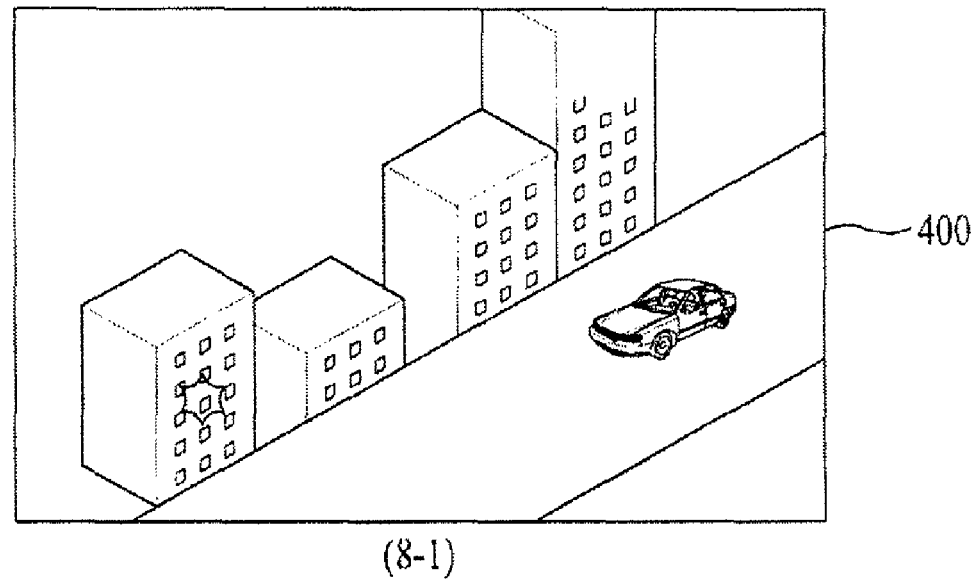
FIG. 8 is a diagram of display screen configurations for implementing a method of controlling a mobile terminal according to another embodiment of the present invention.
Figure 8:
Figure 8:
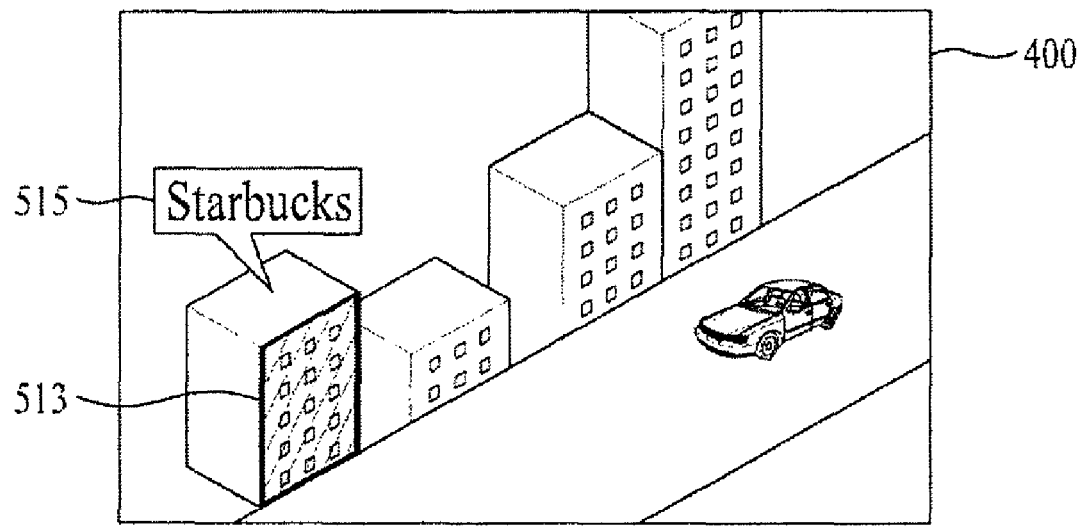

Next, FIGS. 7 and 8 illustrate an alternative embodiment of informing the user of the presence of object information. In particular, FIG. 7 is a flowchart illustrating a method of controlling a mobile terminal according to an embodiment of the present invention, and FIG. 8 is a diagram of display screen configurations for implementing a method of controlling a mobile terminal according to an embodiment of the present invention.

Referring to FIGS. 7 and (8-1) of FIG. 8, the controller 180 displays a camera preview image on the touchscreen 400 (S71). Then, the user touches one object in the camera preview image (S72). The controller 180 then obtains current position information of the mobile terminal 100 via the position location module 115 (S73).

Further, the steps S73 and S71 can be performed simultaneously. Alternatively, the step S73 can be performed before the step S71 or between the steps S71 and S72. Alternatively, the steps S73 and S72 can be simultaneously performed.

Then, the controller 180 determines whether object information corresponding to the touched object exists using at least one of the obtained current position information and the shape recognizing information of the camera preview image (S74). If the information corresponding to the touched object does not exist (No in S74), the controller 180 continuously or periodically determines whether another object within the camera preview image is touched.

If the information corresponding to the touched object exists (Yes in S74), the controller 180 activates the object information display function (S75). Therefore, referring to (8-2) of FIG. 8, the controller 180 displays the object display indicator 513 and the object information 515 corresponding to the touched object in the camera preview image displayed on the touchscreen 400 (S76).

As mentioned in the foregoing description with reference to (5-3) of FIG. 5, if at least two objects exist within the camera preview image, object information corresponding to the at least two objects existing within the camera preview image can be simultaneously displayed, by which the present embodiment is non-limited. Further, the corresponding object informations can be configured in a manner of being displayed one by one, which will now be explained in more detail with reference to FIGS. 9 to 11.

Figure 9:
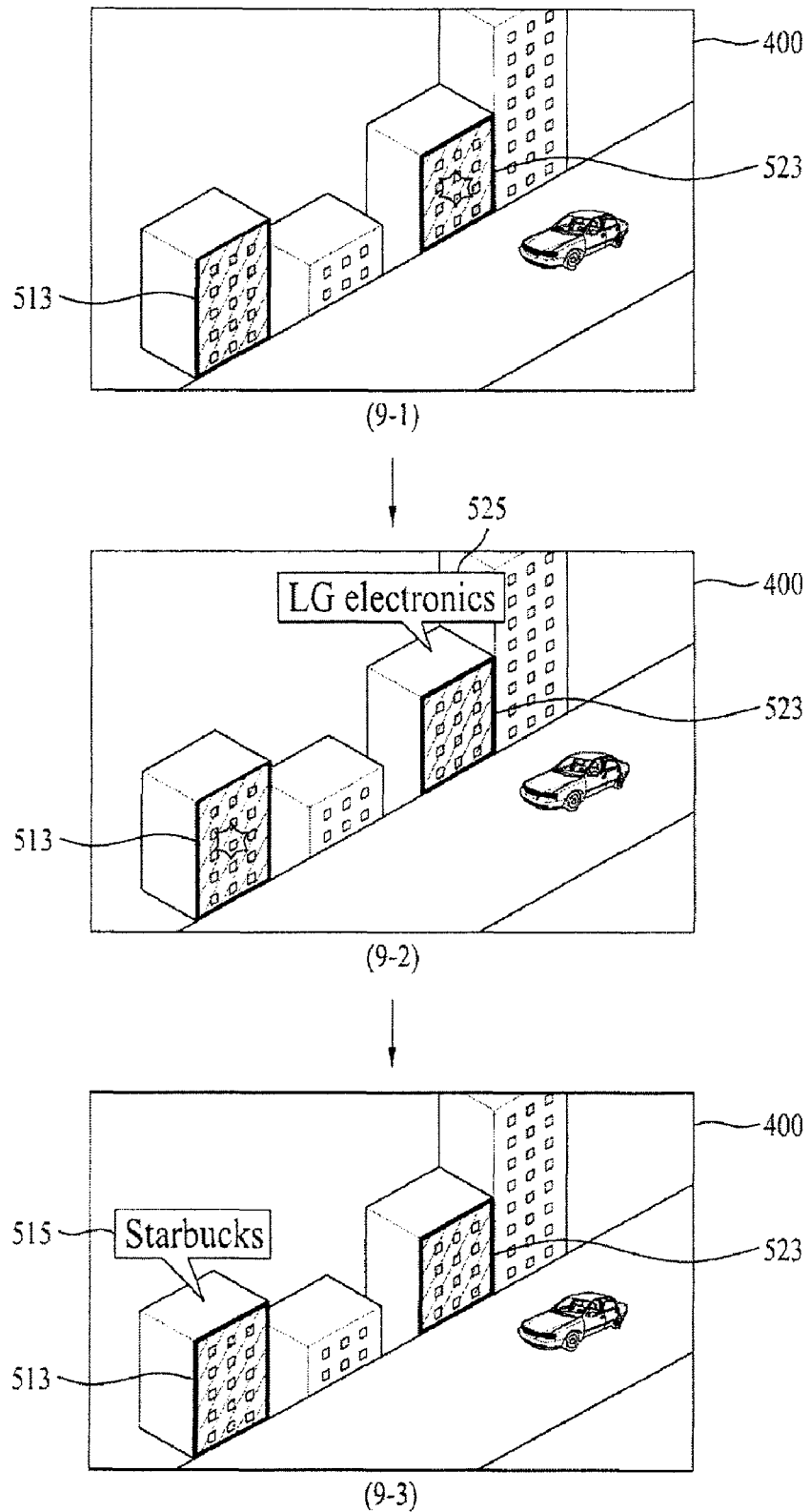
FIGS. 9 to 11 are diagrams of display screen configurations for implementing a method of controlling a mobile terminal according to an embodiment of the present invention.
Figure 10:
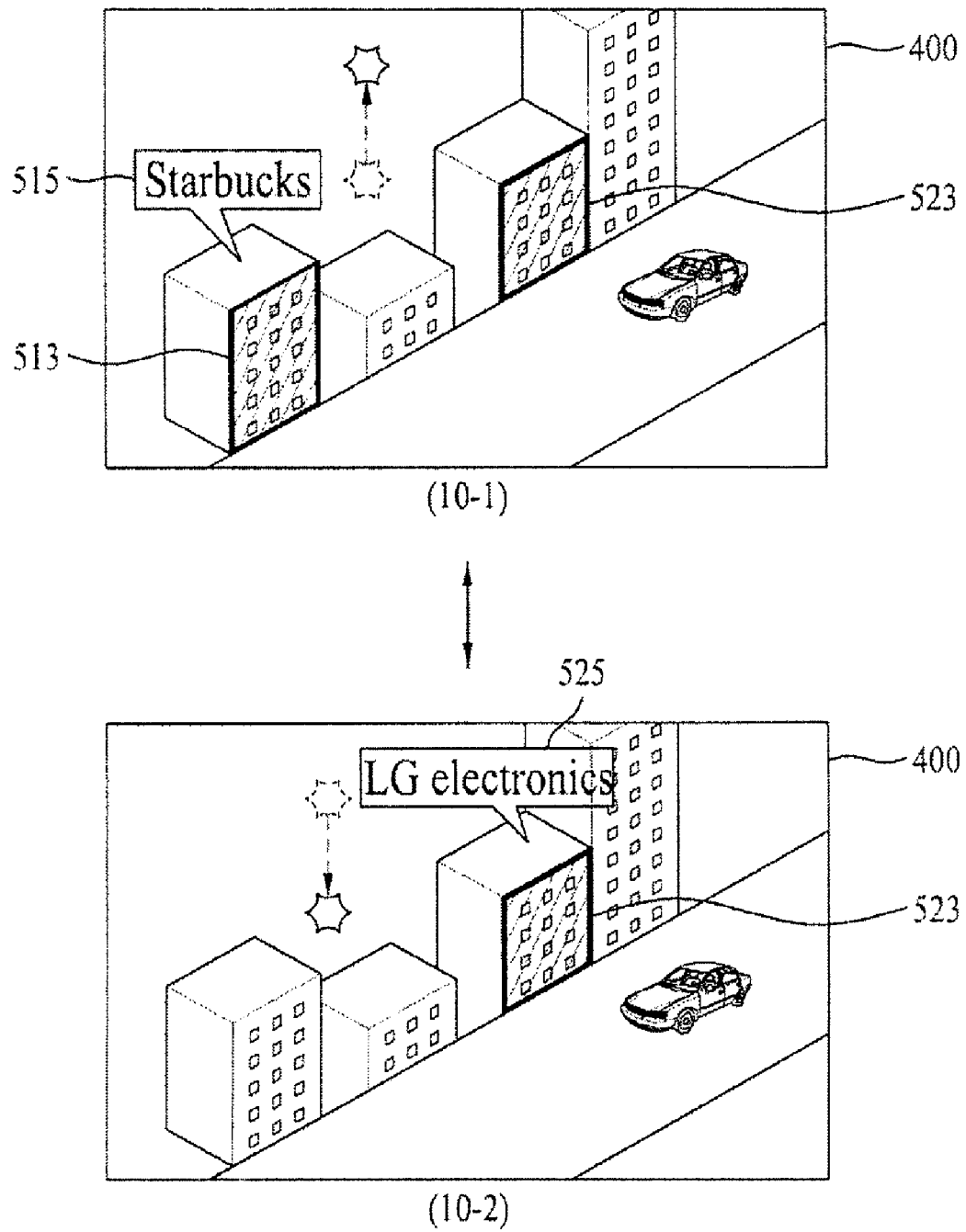
Figure 11:
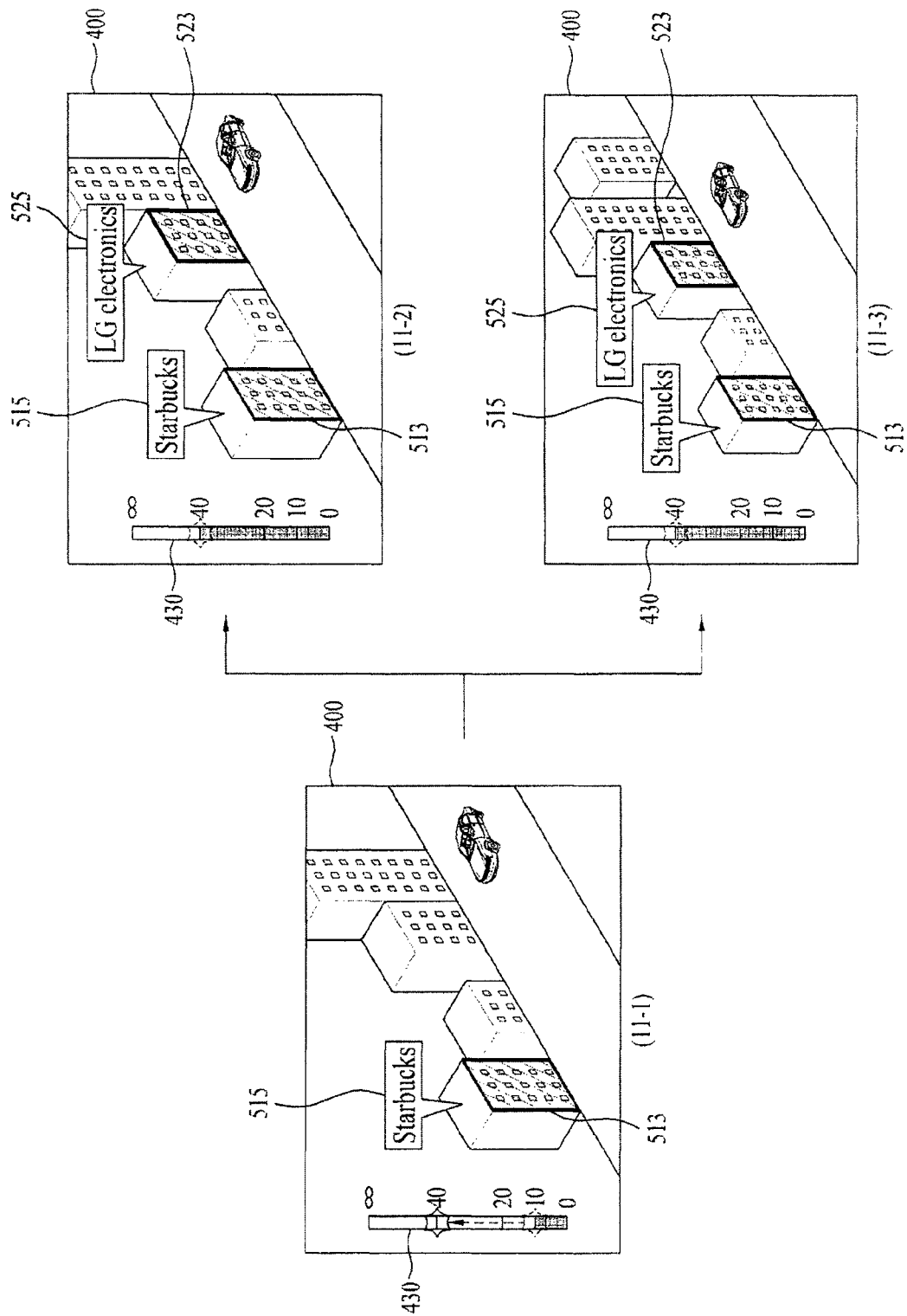

In FIGS. 9 to 11 are diagrams of display screen configurations for implementing a method of controlling a mobile terminal according to an embodiment of the present invention. In addition, the following description of FIGS. 9 to 11 is made on the assumption that two objects, i.e., a first object and a second object exist within the camera preview image. However, as discussed above, three or more objects can also exist within the camera preview image.

Referring to (9-1) of FIG. 9, the controller 180 displays the first object display indicator 513 and the second object display indicator 523 within the camera preview image displayed on the touchscreen 400 corresponding to a first object and a second object, respectively. The second object or the second object display indicator 523 can be touched with such a pointer as a finger, a stylus pen and the like. If so, referring to (9-2) of FIG. 9, the controller 180 displays a second object information 525 corresponding to the second object in the camera preview image to correspond to the second object.

Subsequently, the first object for the first object display indicator 513 can be touched. If so, referring to (9-3) of FIG. 9, the controller 180 removes the second object information 525 from the camera view image and displays the first object information 515 corresponding to the first object. In addition, rather than removing the second object information 525 if the first object or the first object display indicator is touched, the controller 180 can display the second object information 525 together with the first object information 515. In this instance, the controller 180 can remove the second object information 525 if one of the second object, the second object display indicator 523 and the second object information 525 is touched.

Referring to (10-1) of FIG. 10, the controller displays the first object display indicator 513 and the first object information 515, which correspond to a first object closest to a current position of the terminal, in a camera preview image displayed on the touchscreen 400. The user can then input a first prescribed user command via the user input unit 130 such as a touch & drag or a flicking operation in a prescribed direction on the touchscreen 400. Alternatively, the controller 180 can determine that a prescribed period of time passes after the first object display indicator 513 and the first object information 515 have been displayed.

If so, referring to (10-2) of FIG. 10, the controller 180 removes the first object display indicator 513 and the first object information 515 from the camera preview image displayed on the touchscreen 400, and displays the second object display indicator 523 and the second object information 525, which correspond to the second object second closest to the current position of the terminal, in a camera preview image displayed on the touchscreen 400.

If a second prescribed user command is input via the user input unit 130 or a prescribed period of time passes again, the controller 180 can remove the second object display indicator 523 and the second object information 525 and display the first object display indicator 513 and the first object information 515. In addition, the second prescribed user command may be equal to or different from the first prescribed user command. For instance, the second prescribed user command can include a touch & drag operation in a direction opposite to the prescribed direction on the touchscreen 400.

Further, the controller 180 does not have to display the object information corresponding to the object closest to the current position of the terminal. For example, the controller 180 can display objection information of an object located at a specific position (e.g., a most center position) within the camera preview image. Then, when the user inputs a touch & drag operation, for example, in a prescribed direction (e.g., a right direction) on the touchscreen 400, the controller 180 can display corresponding object information of another object located right next or adjacent to the former object in the prescribed direction (e.g., the object located to the right side of the former object).

Next, referring to (11-1) of FIG. 11, the controller 180 can display a distance indicator bar 430 indicating a prescribed distance related to an object information display set by a terminal user on the touchscreen 400. Further, the following description refers to the prescribed distance as a first distance. If so, the controller 180 displays the first object display indicator 513 of the first object, which is located within the first distance from a current position of the terminal, and the first object information 515 on the first object in a camera preview image displayed on the touchscreen 400.

As mentioned in the foregoing description, if the database of the memory 160 is the portion of the database downloaded from the external server, the database of the memory 160 may be only for objects within the first distance from the current position. Subsequently, the user can input a user command via the user input unit 130. For example, the user command can be performed in a manner that the distance indicator bar 430 displayed on the touchscreen 400 is touched with a pointer or finger and then dragged.

If so, the prescribed distance is adjusted into a second distance from the first distance. In this example, the second distance is greater than the first distance. If the database of the memory 160 is the portion of the database downloaded from the external server, the controller 180 can update the database of the memory 160 for the objects within the second distance from the external server.

Subsequently, the controller 180 can search the objects located within the second distance. Referring to (11-2) of FIG. 11, the controller 180 can display the first object display indicator 513 and first object information 515 of the first object, which is located within the second distance from a current position of the terminal, and the second object display indicator 523 and second object information 525 of the second object, which is located within the second distance from the current position of the terminal, in the camera preview image displayed on the touchscreen 400.

In particular, once a prescribed distance is determined by a terminal user, the controller 180 can display object information on objects located within the prescribed distance. Meanwhile, when the user command is input, referring to (11-3) of FIG. 11, the controller 180 can control the camera preview image to be zoomed in or out according to the adjusted second distance. As the prescribed distance increases from the first distance to the second distance, as shown in (11-3) of FIG. 11, the camera preview image zoomed out for example. Further, as the prescribed distance decreases to the first distance from the second distance, the camera preview image, as shown in (11-1) of FIG. 11, can be zoomed in as well.

In the following description, a situation that the object information includes relevant link information is explained with reference to FIG. 12. In particular, FIG. 12 is a diagram of display screen configurations for implementing a method of controlling a mobile terminal according to an embodiment of the present invention.

Figure 12:
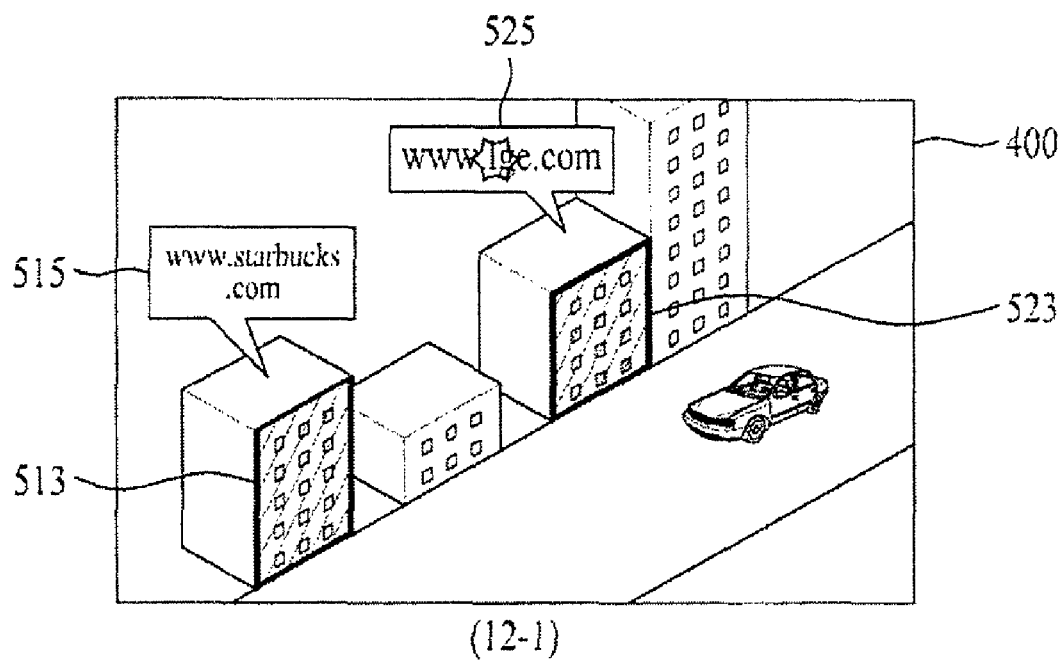
FIG. 12 is a diagram of display screen configurations for implementing a method of controlling a mobile terminal according to yet another embodiment of the present invention.
Figure 12:

Referring to (12-1) of FIG. 12, the controller 180 can display the object information 515 and 525 including relevant link information in a camera preview image displayed on the touchscreen 400. Further, to emphasize that the object information has the relevant link information in (12-1) of FIG. 12, the controller 180 can display corresponding link information as the object information in the camera preview image.

Then, the user can select one of the object information 515 and 525 by touching the object information. In FIG. 12, the user has selected object information 525. If so, referring to (12-2) of FIG. 12, the controller 180 can display a webpage Internet-accessed according to the corresponding link information of the touched object information 525 on the touchscreen 400. When the webpage is displayed, the controller 180 can also reduce power consumption caused by the object information module by deactivating the object information module.

Figure 13:
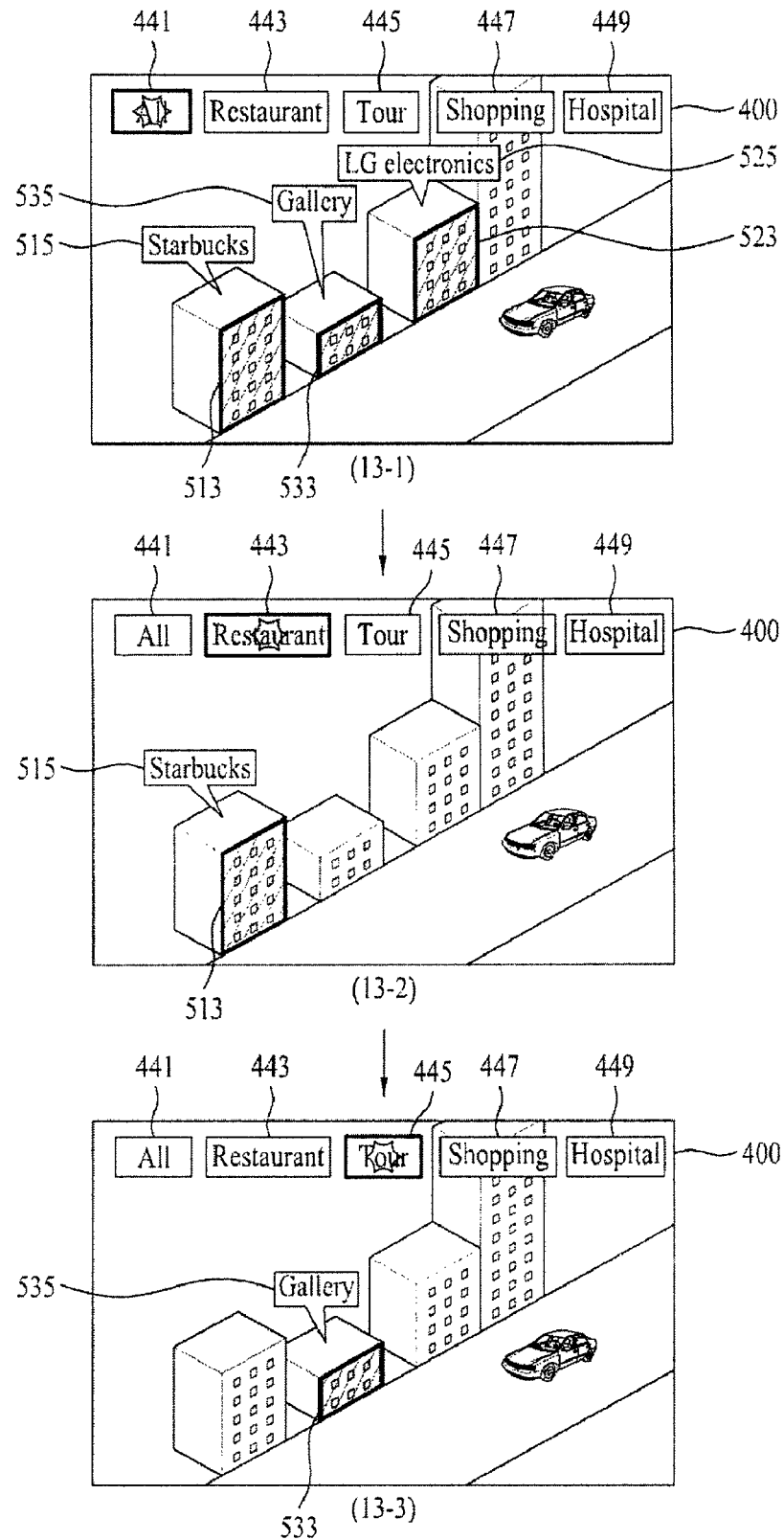
FIGS. 13 and 14 are diagrams of display screen configurations for implementing a method of controlling a mobile terminal according to still another embodiment of the present invention.
Figure 14:
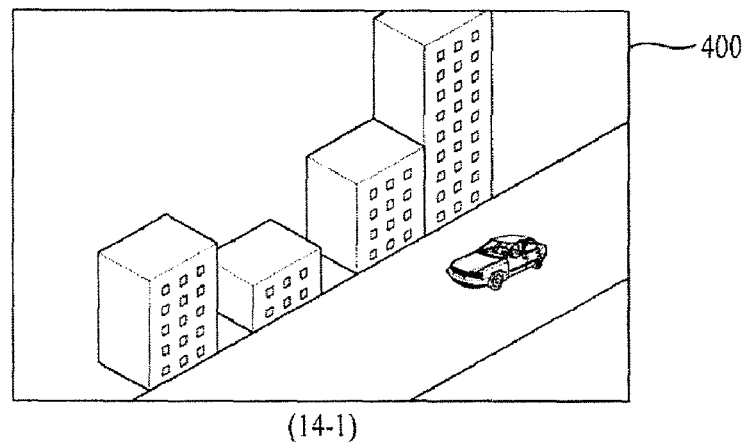
Figure 14:
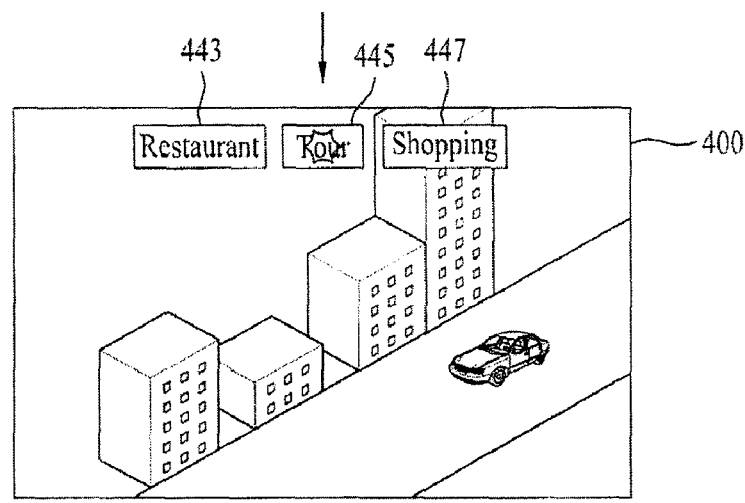
Figure 14:
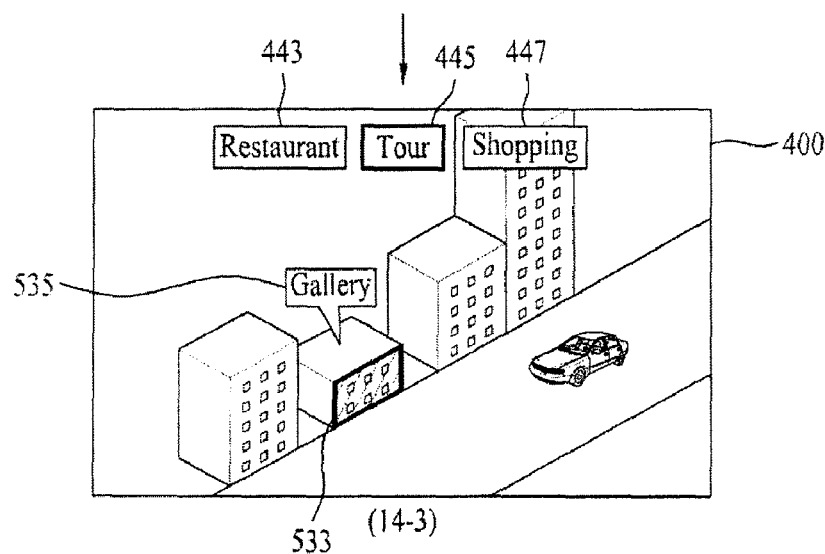

The above-mentioned object information can also be classified into several categories according to their attributes, and the object information belonging to a specific one of the categories can be sorted out and displayed. These additional features will now be explained with reference to FIGS. 13 and 14. In particular, FIGS. 13 and 14 are diagrams of display screen configurations for implementing a method of controlling a mobile terminal according to an embodiment of the present invention. In FIGS. 13 and 14, all three objects, i.e., first to third objects are assumed to exist in the camera view image.

Referring to (13-1) of FIG. 13, the controller 180 displays a list of categories of objects on the touchscreen 400. In FIG. 13, the categories include a 'restaurant' category 443, a 'tour' category 445, a 'shopping' category 447, a 'hospital' category 449 and an 'all' category 441 including all categories. Further, the categories are non-limited by the above-enumerated five categories.

In addition, (13-1) of FIG. 13 illustrates the user selecting the 'all' category 441. Therefore, the controller 180 displays the first to third object informations 515, 525 and 535 respectively corresponding to first to third objects in the camera preview image (i.e., displays all object information).

Referring to (13-2) of FIG. 13, the user has selected the 'restaurant' category 443, and thus the controller 180 displays the first object information 515 corresponding to the selected 'restaurant' category 443. Further, (13-3) of FIG. 13 illustrates the user selecting the 'tour' category 445, and the controller 180 displaying the third object information 535 corresponding to the selected 'tour' category 445 in the camera preview image. The user can also select the different categories by touching the categories or by operating particular keys on the terminal.

Referring to (14-1) of FIG. 14, the controller 180 displays the camera preview image on the touchscreen 400. In this instance, the controller 180 recognizes categories of objects existing within the camera preview image using at least one of the obtained current position information and the shape recognizing information of the camera preview image. Subsequently, referring to (14-2) of FIG. 14, the controller 180 displays the recognized categories 443, 445 and 447. The user can then select one category from the displayed categories. Referring to (14-3) of FIG. 14, the controller 180 displays at least one object information 535 belonging to the selected category in the camera preview image displayed on the touchscreen 400.

In the following description, a method of displaying an object information corresponding to an input keyword will be explained with reference to FIG. 15. In particular, FIG. 15 is a diagram of display screen configurations for implementing a method of controlling a mobile terminal according to yet another embodiment of the present invention.

Figure 15:
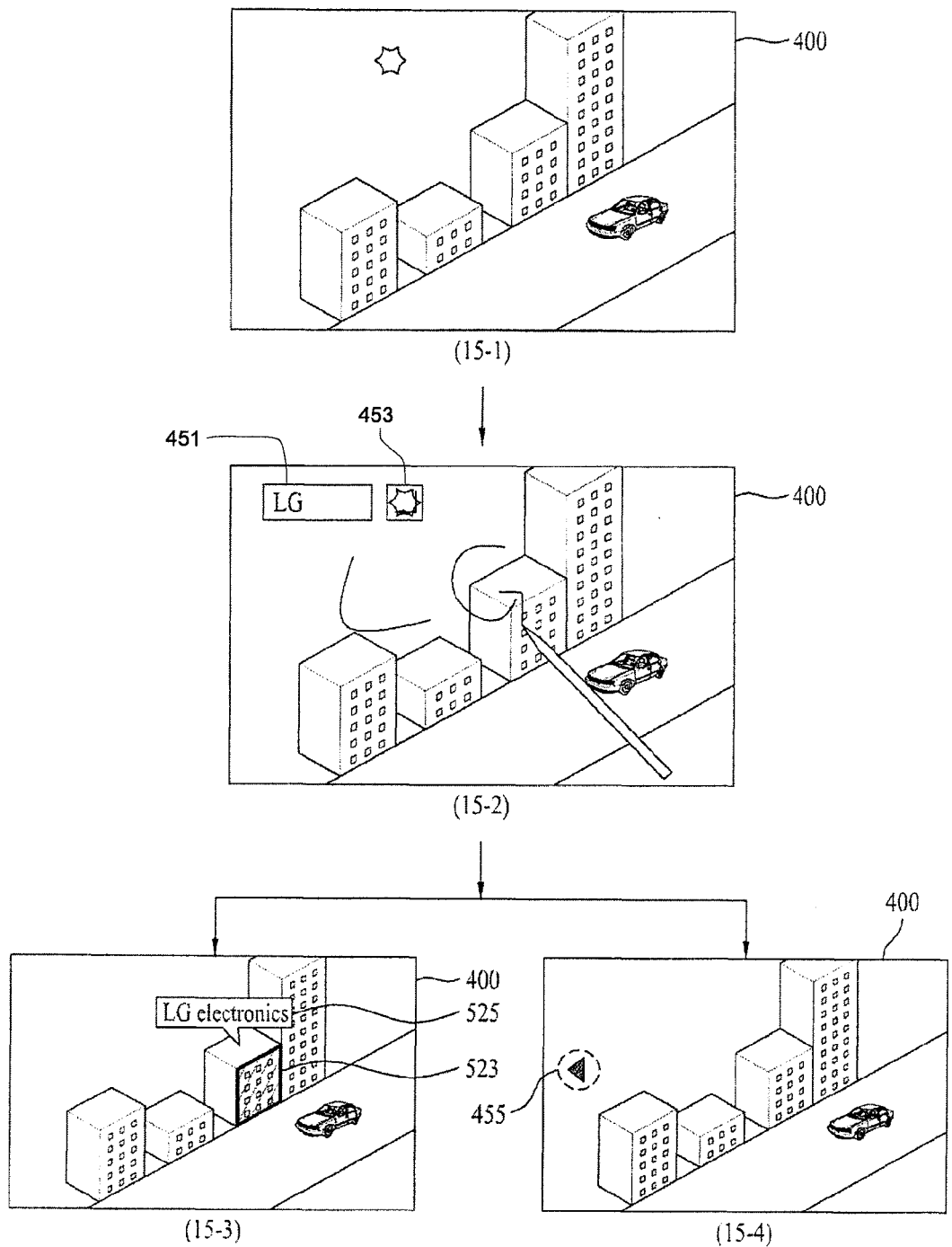
FIG. 15 is a diagram of display screen configurations for implementing a method of controlling a mobile terminal according to an embodiment of the present invention.

Referring to (15-1) of FIG. 15, the controller 180 displays a camera preview image on the touchscreen 400. The user can then input a prescribed user command via a proper manipulation of the user input unit 130. The user command can be performed by touching the touchscreen 400, for example.

If so, referring (15-2) of FIG. 15, the controller 180 displays a text input box 451 for a prescribed keyword input and a search execute icon 453 on the touchscreen 400. The user can then input a prescribed keyword input on the touchscreen 400 (e.g., by writing the keyword on the touchscreen as shown in (15-2) of FIG. 15). The controller 180 then recognizes the text of the written keyword and inputs the corresponding text to the text input box 451.

The user can then select the search execute icon 453. Then, if an object having an object information corresponding to the input keyword exists within the camera preview image, the controller 180 displays the object information 525 as shown in (15-3) of FIG. 15. In particular, (15-3) of FIG. 15 illustrates the controller 180 displaying the second object display indicator 523 and the second object information 525.

If the object having the object information corresponding to the input keyword does not exist within the camera preview image, the controller 180 displays a direction indicator 455, which indicates a direction for moving the mobile terminal 100 to enable the object having the object information to appear in the camera preview image on the touchscreen 400 as shown in (15-4) of FIG. 15.

The foregoing descriptions explain how to display the object information in the camera preview information. The following description explains how to store the camera preview image in the memory 160 with reference to FIGS. 16 and 17. In particular, FIGS. 16 and 17 are flowcharts illustrating a method of controlling a mobile terminal according to yet another embodiment of the present invention.

Figure 16:
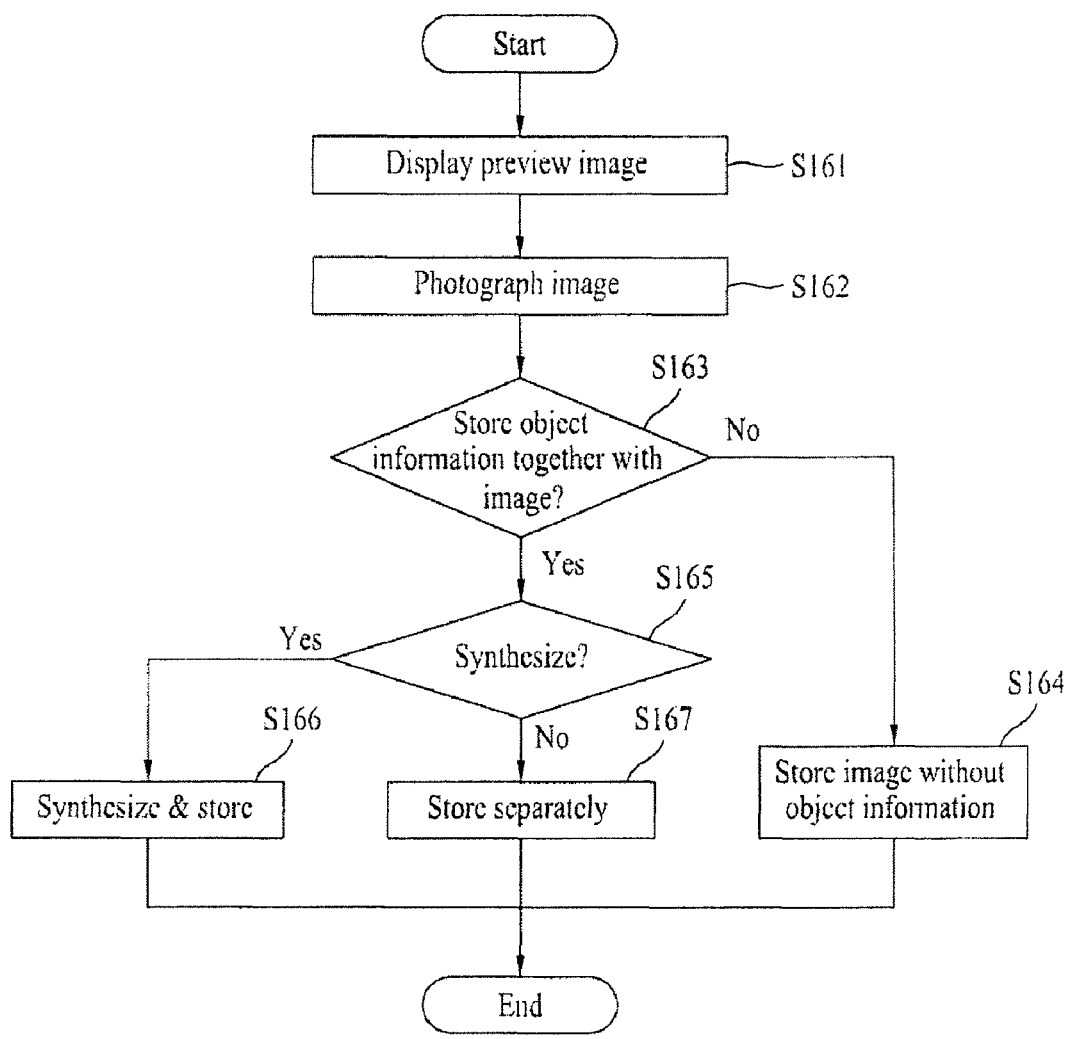
FIGS. 16 and 17 are flowcharts illustrating a method of controlling a mobile terminal according to an embodiment of the present invention.
Figure 17:
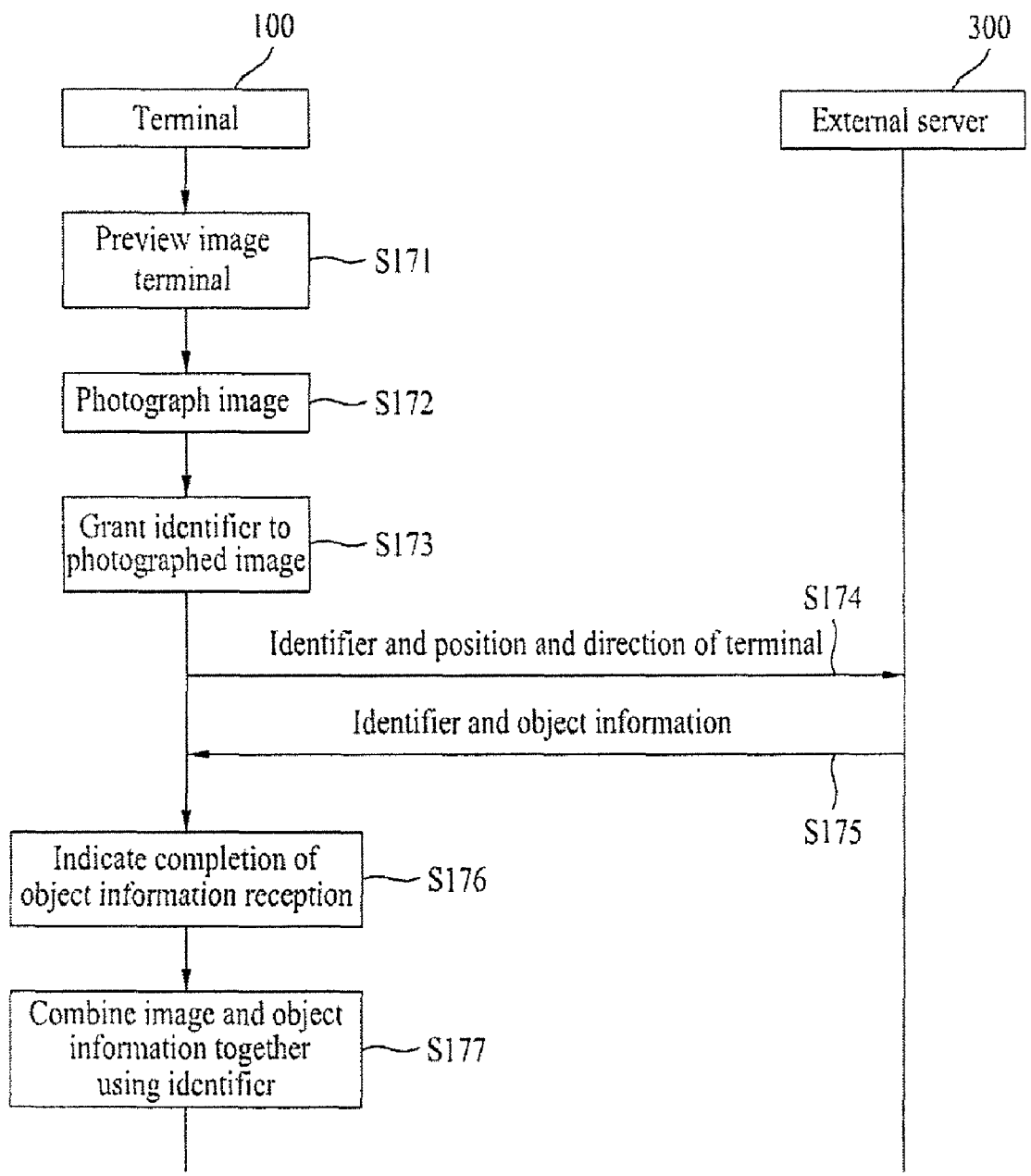

Referring to FIG. 16, the controller 180 displays a prescribed camera preview image on the touchscreen 400 (S161). Also, for the camera preview image to be photographed and stored as a picture file through proper manipulations of the user input unit 130, the terminal user inputs an image photograph command (i.e., a shutter command) (S162). Further, the picture file can include a moving picture file or a still image picture file.

Then, the controller 180 displays a guide window, which queries whether object information corresponding to at least one or more objects within the camera preview image will be stored together on the touchscreen 400 (S163). If the terminal user does not attempt to store the object information together through a proper manipulation of the user input unit 130 (No in S163), the controller 180 stores the photographed camera preview image only without the object informations (S164).

If the terminal user attempts to store the object information together through a proper manipulation of the user input unit 130 (Yes in S163), the controller displays a guide window for querying whether the object information will be stored by being synthesized with the photographed camera preview image (S165). If the terminal user attempts to store the object information by having them synthesized with the camera preview image through a proper manipulation of the user input unit (Yes in S165), the controller 180 synthesizes the object informations and the camera preview image together into one picture file and then stores the picture file (S166).

If the terminal user does not attempt to store the object informations by having them synthesized with the camera preview image through a proper manipulation of the user input unit (No in S165), the controller 180 stores the camera preview image as a picture file in a manner that the object information is separated as a separate file linked to the picture file (S167). Therefore, when the picture file is played and/or displayed in the mobile terminal 100, the object information can be also displayed according to a selection made by the terminal user.

Referring to FIG. 17, the controller 180 displays a prescribed camera preview image on the touchscreen 400 (S171). Also, for the camera preview image to be photographed and stored as a picture file through proper manipulations of the user input unit 130, the terminal user inputs an image photograph command (i.e., a shutter command) (S172).

The controller 180 then generates an identifier using a current time information on photographing the camera preview image in order to identify the photographed camera preview image from other images and then assigns the generated identifier to the stored picture file (S173). Further, the identifier can be assigned as a file name of the picture file or as a tag information of the picture file. In the picture file, a position information of the mobile terminal located in photographing the camera preview image can also be stored as a tag.

Subsequently, after the camera preview image has been photographed and when a user command for playing back the stored picture file is input, the mobile terminal 100 transmits the identifier of the stored picture file and the position information to an external server 300 having an object information database via the wireless communication unit 110 (S174). If necessary, the mobile terminal 100 can also transmit other information (e.g., the shape recognizing information of the preview image) required for the external server 300 to search for the object information corresponding to the photographed preview image to the external server together with the identifier and the position information.

Subsequently, the mobile terminal 100 receives the searched object information from the external server 300 together with the identifier (S175). The controller 180 then outputs an announcement indicating that the object information reception is completed on the touchscreen 400 (S176). The controller 180 also searches for a picture file having the same identifier of the received identifier and then combines the received object information with the searched picture file (S177). In this instance, the object information can be stored together with the picture file. Alternatively, the object information can be displayed on an image of the picture file when the picture file is played back.

In addition, one portion of an object information on one object can be searched from the object information database of the memory 160 and the other portion of the object information can be searched from the object information database of the external server via the wireless communication unit 110.

Also, one portion information (e.g., 'basic information') stored in the object information database of the memory 160 can include non-variable information (e.g., a building location, etc.) on the object and/or small-size information (e.g., a building name, etc.) on the object. The other portion information (e.g., 'detail information') stored in the object information database of the external server can include variable information (e.g., a list of occupants in a building, etc.) on the object and/or large-size information (e.g., multimedia information on a building, etc.) on the object.

In addition, the displayed object information includes textual information that the user can easily read to determine what places, buildings, etc. are located within the preview image.

Accordingly, the present invention provides several advantages. First, according to at least one embodiment of the present invention, information for helping the user such as a place or position information within a preview image displayed for image photographing can be provided to a terminal user. Second, the user can easily determine names of places or buildings within a photographed picture.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include Internet transmissions. In addition, the computer can include the controller 180 of the terminal.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
   a user input unit configured to receive user-inputs;
   a wireless communication unit configured to wirelessly communicate with at least one other terminal;
   at least one camera configured to capture images;
   a touchscreen configured to display a camera preview image captured by the camera;
   a position-location processor configured to obtain information on a current position of the mobile terminal;
   an object information processor configured to obtain textual object information existing within the camera preview image; and
   a controller configured to:
   display an object information presence indicator on the touchscreen indicating that textual object information exists within the camera preview image before displaying the textual object information,
   display an object information activation indicator indicating that the controller is activated to display the textual object information on the touchscreen and an object display indicator corresponding to the object, when the object information presence indicator is selected,
   display the textual object information on the touchscreen together with the camera preview image identifying objects included within the preview image based on the obtained current position of the mobile terminal, when the object display indicator is selected, and
   deactivate the object information processor if a prescribed webpage is accessed via the wireless communication unit based on a selection of the textual object information,
   wherein if at least two objects exist within the camera preview image, the controller is further configured to display textual object information of the object closest to the current position of the mobile terminal, and
   wherein if a prescribed user command is input or a prescribed period of time passes, the controller is further configured to display textual object information of the object second closest to the current position of the mobile terminal.

2. The mobile terminal of claim 1, wherein the controller is further configured to display the object information presence indicator on the touchscreen without being visually mapped to any of the objects.

3. The mobile terminal of claim 1, wherein the controller is further configured to display the same number of the object information presence indicators on the touchscreen regardless of the number of the objects within the camera preview image.

4. The mobile terminal of claim 1, wherein the controller is further configured to display the textual object information if a position of the object is within a prescribed distance from the obtained current position of the mobile terminal.

5. The mobile terminal of claim 1, further comprising:
   a memory configured to store an object information database downloadable via the wireless communication unit,
   wherein the controller is further configured to obtain the corresponding object information from the object information database.

6. The mobile terminal of claim 5, wherein the downloaded object information database comprises an object information database for an object located within a predetermined distance from the obtained current position of the mobile terminal.

7. The mobile terminal of claim 1, wherein the controller is further configured to control the wireless communication unit to obtain the textual object information from an external server.

8. The mobile terminal of claim 1, wherein when an object included within the preview image is selected, the controller is further configured to check whether textual object information exists for the selected object, and to automatically display the textual object information for the selected object on the touchscreen if the textual object information exists for the selected object.

9. The mobile terminal of claim 1, wherein if at least two objects exist within the camera preview image, the controller is further configured to display corresponding object display indicators for each of the at least two objects.

10. The mobile terminal of claim 9, wherein if one of the displayed object display indicators is selected, the controller is further configured to display textual object information on the touchscreen for the selected object identified by the object display indicator.

11. The mobile terminal of claim 1, wherein the controller is further configured to display a plurality of object information categories on the touchscreen, and when one of the object information categories is selected, to display only textual object information for objects that belong in the selected object information category.

12. The mobile terminal of claim 1, wherein the controller is further configured to automatically display textual object information for an object within the camera preview image when the object is within a prescribed distance from the current position of the mobile terminal.

13. The mobile terminal of claim 12, wherein the prescribed distance is set by a terminal user.

14. A method of controlling a mobile terminal, the method comprising:
    allowing, via a wireless communication unit, wireless communication with at least one other terminal;
    capturing, via at least one camera provided on the mobile terminal, a camera preview image;
    displaying, on a touchscreen of the mobile terminal, the captured camera preview image;
    obtaining, via a position-location processor, information on a current position of the mobile terminal;
    obtaining, via an object information processor, textual object information existing within the camera preview image;
    displaying, via a controller, an object information presence indicator on the touchscreen indicating that textual object information exists within the camera preview image before displaying the textual object information when it is detected that at least one object existing within the camera preview image has at least one object information;
    displaying, via the controller, an object information activation indicator indicating that the controller is activated to display the textual object information on the touchscreen and an object display indicator corresponding to the object when the object information presence indicator is selected;
    displaying, via the controller, the textual object information together with the camera preview image on the touchscreen identifying objects included within the preview image based on the obtained current position of the mobile terminal, when the object display indicator is selected; and
    deactivating, via the controller, the object information processor if a prescribed webpage is accessed via the wireless communication unit based on a selection of the textual object information,
    wherein if at least two objects exist within the camera preview image, the method further comprises displaying, via the controller, textual object information of the object closest to the current position of the mobile terminal, and
    wherein if a prescribed user command is input or a prescribed period of time passes, the method further comprises displaying, via the controller, textual object information of the object second closest to the current position of the mobile terminal.

15. The method of claim 14, further comprising:
    displaying, via the controller, the textual object information if a position of the object is within a prescribed distance from the obtained current position of the mobile terminal; and
    displaying an object information activation indicator indicating that the controller is activated to display the textual object information on the touchscreen.

16. The method of claim 14, wherein when an object included within the preview image is selected, the method further comprises:
    checking, via the controller, whether textual object information exists for the selected object; and
    automatically displaying the textual object information for the selected object on the touchscreen if the textual object information exists for the selected object.

17. The method of claim 14, further comprising:
    displaying, via the controller, a plurality of object information categories on the touchscreen, and when one of the object information categories is selected, displaying only textual object information for objects that belong in the selected object information category.

18. The method of claim 14, further comprising:
    automatically displaying, via the controller, textual object information for an object within the camera preview image when the object is within a prescribed distance from the current position of the mobile terminal,
    wherein the prescribed distance can be updated by a terminal user.

19. The method of claim 14, further comprising:
    displaying, via the controller, the object information presence indicator on the touchscreen without being visually mapped to any of the objects.

20. The method of claim 14, further comprising:
    displaying, via the controller, the same number of the object information presence indicators on the touchscreen regardless of the number of the objects within the camera preview image.

* * * * *